US012649522B2

(12) United States Patent
Fisher et al.

(10) Patent No.: US 12,649,522 B2
(45) Date of Patent: Jun. 9, 2026

(54) VEHICLE BODY MOUNTING CONFIGURATION

(71) Applicant: Oshkosh Corporation, Oshkosh, WI (US)

(72) Inventors: Aaron Fisher, Oshkosh, WI (US); Chris Mills, Oshkosh, WI (US); Greg Steffens, Oshkosh, WI (US); Ryan Wolf, Oshkosh, WI (US); Eric Hutchinson, Oshkosh, WI (US); Jeff Verhagen, Oshkosh, WI (US); Jon Branson, Oshkosh, WI (US)

(73) Assignee: OSHKOSH CORPORATION, Oshkosh, WI (US)

( * ) Notice: Subject to any disclaimer, the term of this patent is extended or adjusted under 35 U.S.C. 154(b) by 539 days.

(21) Appl. No.: 18/171,115

(22) Filed: Feb. 17, 2023

(65) Prior Publication Data

US 2023/0311991 A1      Oct. 5, 2023

Related U.S. Application Data

(60) Provisional application No. 63/325,950, filed on Mar. 31, 2022.

(51) Int. Cl.
B62D 21/02 (2006.01)

(52) U.S. Cl.
CPC .................................... B62D 21/02 (2013.01)

(58) Field of Classification Search
CPC ............. B62D 21/02; B65F 2003/0283; B65F 2003/0276; B65F 2003/023; B65F 3/08; B65F 3/201; B65F 2003/006; B60P 1/48
See application file for complete search history.

(56) References Cited

U.S. PATENT DOCUMENTS

| | | | | | |
|---|---|---|---|---|---|
| 3,463,501 | A | * | 8/1969 | Field ......................... | B60P 3/22 |
| | | | | | 296/35.1 |
| 3,588,137 | A | * | 6/1971 | Field ....................... | B60P 3/222 |
| | | | | | 280/838 |
| 4,200,535 | A | * | 4/1980 | Kennedy, Jr. ........... | B04C 5/185 |
| | | | | | 210/512.1 |
| 10,859,167 | B2 | * | 12/2020 | Jax ........................... | F01L 1/46 |
| 2019/0276102 | A1 | | 9/2019 | Zuleger et al. | |
| 2020/0290237 | A1 | | 9/2020 | Steffens et al. | |
| 2020/0291846 | A1 | | 9/2020 | Steffens et al. | |
| 2021/0171137 | A1 | | 6/2021 | Zuleger et al. | |

(Continued)

OTHER PUBLICATIONS https://info.macktrucks.com/refuse-revolution; "Welcome to the refuse revolution. Mack LR Electric." Retrieved on Mar. 21, 2023.

(Continued)

*Primary Examiner* — Lori Lyjak
(74) *Attorney, Agent, or Firm* — Foley & Lardner LLP

(57) ABSTRACT

A vehicle includes a chassis including a pair of longitudinal frame rails, a body, a pivot mount pivotally coupling the body to the chassis such that the body is rotatable about an axis of rotation extending laterally, and a spring mount coupling the body to the chassis. The spring mount is positioned longitudinally forward of the axis of rotation and configured to apply a biasing force to resist upward movement of the body relative to the chassis. The spring mount is positioned within 3 feet of a neutral twist axis of the chassis.

20 Claims, 28 Drawing Sheets

(56) References Cited

U.S. PATENT DOCUMENTS

| | | | |
|---|---|---|---|
| 2021/0276643 | A1 | 9/2021 | Ellifson et al. |
| 2022/0072736 | A1 | 3/2022 | Steffens et al. |
| 2022/0118854 | A1 | 4/2022 | Davis et al. |
| 2023/0070279 | A1 | 3/2023 | Wheeler et al. |
| 2023/0070769 | A1 | 3/2023 | Wheeler et al. |
| 2023/0074504 | A1 | 3/2023 | Ellifson et al. |

OTHER PUBLICATIONS https://www.youtube.com/watch?v=NQFtAnm7D-c; "All-New Mack LR Electric Garbage Truck." Retrieved on Mar. 21, 2023.

* cited by examiner

VEHICLE BODY MOUNTING CONFIGURATION

CROSS-REFERENCE TO RELATED PATENT APPLICATION

This application claims the benefit of and priority to U.S. Provisional Application No. 63/325,950, filed on Mar. 31, 2022, the entire disclosure of which is hereby incorporated by reference herein.

BACKGROUND

The present disclosure relates generally to vehicles. More specifically, the present disclosure relates to a system and method for mounting a vehicle body to a vehicle frame. In some situations, relative motion can occur between the body and the frame. Depending upon the mounting configuration, this relative motion can impart large forces on components of the vehicle.

SUMMARY

At least one embodiment relates to a vehicle including a chassis including a pair of longitudinal frame rails, a body, a pivot mount pivotally coupling the body to the chassis such that the body is rotatable about an axis of rotation extending laterally, and a spring mount coupling the body to the chassis. The spring mount is positioned longitudinally forward of the axis of rotation and configured to apply a biasing force to resist upward movement of the body relative to the chassis. The spring mount is positioned within 3 feet of a neutral twist axis of the chassis.

Another embodiment relates to a refuse vehicle. The refuse vehicle includes a chassis including a pair of longitudinal frame rails and a body. The body includes a refuse compartment defining a hopper volume and a storage volume, a midpost positioned between the hopper volume and the storage volume, and a packer configured to move within the hopper volume and the storage volume. The refuse vehicle further includes a lift assembly configured to engage and lift a refuse container to transfer refuse from the refuse container into the hopper volume, a pivot mount pivotally coupling the body to the chassis such that the body is rotatable about an axis of rotation extending laterally, and a spring mount coupling the body to the chassis and configured to apply a biasing force to resist upward movement of the body relative to the chassis. The spring mount is positioned longitudinally forward of the axis of rotation and the midpost.

Another embodiment relates to a refuse vehicle. The refuse vehicle includes a chassis including a pair of longitudinal frame rails and a body. The body includes a refuse compartment defining a hopper volume and a storage volume, a midpost positioned between the hopper volume and the storage volume, and a packer configured to move within the hopper volume and the storage volume. The refuse vehicle further includes a lift assembly configured to engage and lift a refuse container to transfer refuse from the refuse container into the hopper volume, a pivot mount pivotally coupling the body to the chassis such that the body is rotatable about an axis of rotation extending laterally, a cylinder coupled to the body and the chassis, and a spring mount coupling the body to the chassis and configured to apply a biasing force to resist upward movement of the body relative to the chassis. The spring mount is positioned longitudinally forward of the axis of rotation and the midpost. The spring mount is positioned longitudinally rearward of the lift assembly and the cylinder. The spring mount is positioned within 3 feet of a neutral twist axis of the chassis.

This summary is illustrative only and is not intended to be in any way limiting. Other aspects, inventive features, and advantages of the devices or processes described herein will become apparent in the detailed description set forth herein, taken in conjunction with the accompanying figures, wherein like reference numerals refer to like elements.

DETAILED DESCRIPTION

Figure 1:
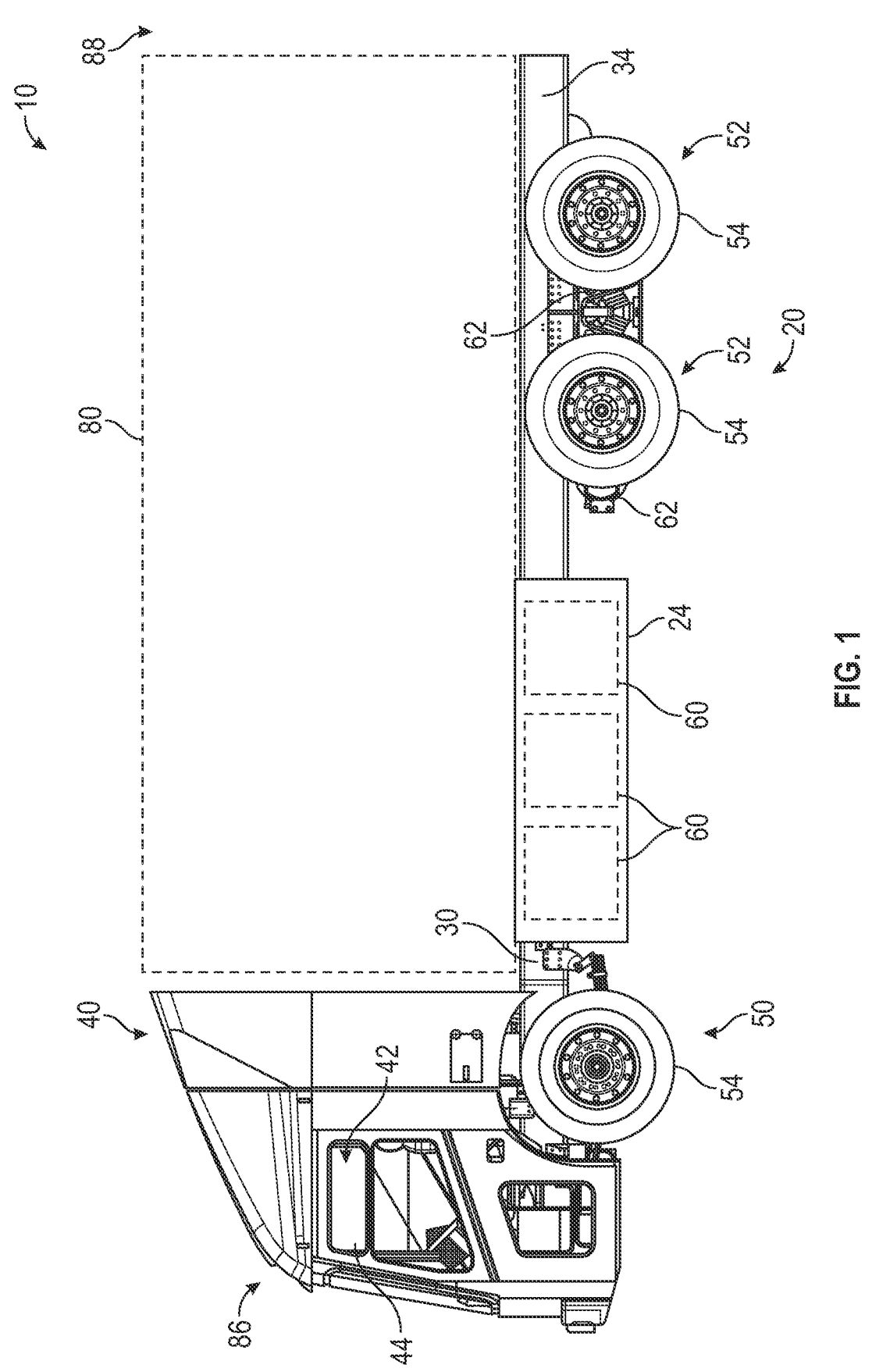
FIG. 1 is a left side view of a vehicle, according to an exemplary embodiment.

Before turning to the figures, which illustrate certain exemplary embodiments in detail, it should be understood that the present disclosure is not limited to the details or methodology set forth in the description or illustrated in the figures. It should also be understood that the terminology used herein is for the purpose of description only and should not be regarded as limiting.

According to an exemplary embodiment, a vehicle includes a body and a chassis. In some situations, it is advantageous to permit relative motion between the body and the chassis. By way of example, the chassis may be more flexible (e.g., compliant) than the body. When crossing a bump or depression in a road, it may be advantageous to permit the chassis to move relative to the body based on the topography of the road to avoid introducing additional stresses in the chassis. To accomplish this, a pivot mount pivotally couples the body to the chassis near a rear end of the chassis. A spring mount is positioned forward of the pivot mount and applies a biasing force to resist movement of the body away from the chassis.

The vehicle may be configured as a side-loading refuse vehicle. In a side-loading refuse vehicle, the body includes a hopper volume that is configured to receive refuse from a lift assembly and a storage volume into which the refuse is packed. A vertical midpost is positioned between the hopper volume and the storage volume. The spring mount may be positioned forward of the midpost and rearward of the lift assembly to minimize forces on the chassis.

When the vehicle is subjected to a force that causes twisting of the chassis about a longitudinal axis, the left and right outboard sides of the vehicle may become inclined in opposing directions (e.g., inclined forward versus inclined backward). Through certain measurement processes, a longitudinal location, described herein as a neutral twist axis, may be identified. The neutral twist axis may represent a longitudinal position where the vertical displacement of the left and right outboard sides of the vehicle is equal. The spring mounts may be mounted near the neutral twist axis to minimize the displacement of the spring mounts in response to a twisting load on the chassis, thereby decreasing the stresses experienced by the chassis.

A pair of hydraulic cylinders are positioned forward of a front wall of the body and coupled to the chassis and the body. A hydraulic system of the vehicle is reconfigurable between a maintenance configuration and a damping configuration. In the maintenance configuration, the hydraulic cylinders are coupled to a pump offboard the vehicle, and the pump provides fluid to the hydraulic cylinders to raise the body relative to the chassis. In the damping configuration, the hydraulic cylinders are fluidly coupled to one or more orifices. Each orifice resists flow out of the hydraulic cylinders, providing a damping force that resists downward movement of the body relative to the chassis. A pair of check valves are fluidly coupled to hydraulic cylinders. They permit fluid to flow freely into the hydraulic cylinders, such that the hydraulic cylinders permit free upward movement of the body relative to the chassis.

Overall Vehicle

Figure 2:
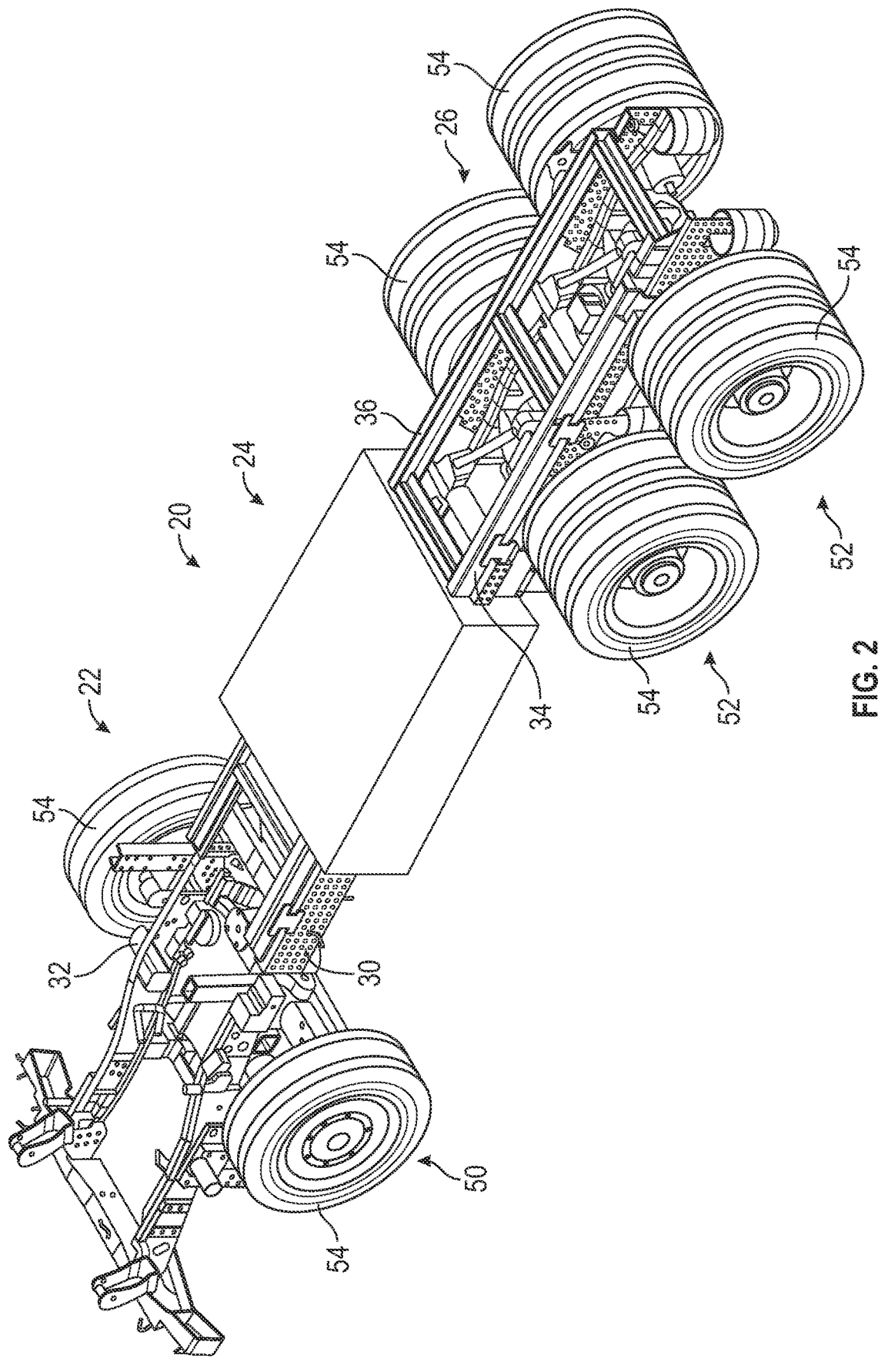
FIG. 2 is a perspective view of a chassis of the vehicle of FIG. 1.

Referring to FIGS. 1 and 2, a reconfigurable vehicle (e.g., a vehicle assembly, a truck, a vehicle base, etc.) is shown as vehicle 10, according to an exemplary embodiment. As shown, the vehicle 10 includes a frame assembly or chassis assembly, shown as chassis 20, that supports other components of the vehicle 10. The chassis 20 extends longitudinally along a length of the vehicle 10, substantially parallel to a primary direction of travel of the vehicle 10. As shown, the chassis 20 includes three sections or portions, shown as front section 22, middle section 24, and rear section 26. The middle section 24 of the chassis 20 extends between the front section 22 and the rear section 26. In some embodiments, the middle section 24 of the chassis 20 couples the front section 22 to the rear section 26. In other embodiments, the front section 22 is coupled to the rear section 26 by another component (e.g., the body of the vehicle 10).

As shown in FIG. 2, the front section 22 includes a pair of frame portions, frame members, or frame rails, shown as front rail portion 30 and front rail portion 32. The rear section 26 includes a pair of frame portions, frame members, or frame rails, shown as rear rail portion 34 and rear rail portion 36. The front rail portion 30 is laterally offset from the front rail portion 32. Similarly, the rear rail portion 34 is laterally offset from the rear rail portion 36. This spacing may provide frame stiffness and space for vehicle components (e.g., batteries, motors, axles, gears, etc.) between the frame rails. In some embodiments, the front rail portions 30 and 32 and the rear rail portions 34 and 36 extend longitudinally and substantially parallel to one another. The chassis 20 may include additional structural elements (e.g., cross members that extend between and couple the frame rails).

In some embodiments, the front section 22 and the rear section 26 are configured as separate, discrete subframes (e.g., a front subframe and a rear subframe). In such embodiments, the front rail portion 30, the front rail portion 32, the rear rail portion 34, and the rear rail portion 36 are separate, discrete frame rails that are spaced apart from one another. In some embodiments, the front section 22 and the rear section 26 are each directly coupled to the middle section 24 such that the middle section 24 couples the front section 22 to the rear section 26. Accordingly, the middle section 24 may include a structural housing or frame. In other embodiments, the front section 22, the middle section 24, and the rear section 26 are coupled to one another by another component, such as a body of the vehicle 10.

In other embodiments, the front section 22, the middle section 24, and the rear section 26 are defined by a pair of frame rails that extend continuously along the entire length of the vehicle 10. In such an embodiment, the front rail portion 30 and the rear rail portion 34 would be front and rear portions of a first frame rail, and the front rail portion 32 and the rear rail portion 36 would be front and rear portions of a second frame rail. In such embodiments, the middle section 24 would include a center portion of each frame rail.

In some embodiments, the middle section 24 acts as a storage portion that includes one or more vehicle components. The middle section 24 may include an enclosure that contains one or more vehicle components and/or a frame that supports one or more vehicle components. By way of example, the middle section 24 may contain or include one or more electrical energy storage devices (e.g., batteries, capacitors, etc.). By way of another example, the middle section 24 may include fuel tanks fuel tanks. By way of yet another example, the middle section 24 may define a void space or storage volume that can be filled by a user.

A cabin, operator compartment, or body component, shown as cab 40, is coupled to a front end portion of the chassis 20 (e.g., the front section 22 of the chassis 20). Together, the chassis 20 and the cab 40 define a front end of the vehicle 10. The cab 40 extends above the chassis 20. The cab 40 includes an enclosure or main body that defines an interior volume, shown as cab interior 42, that is sized to contain one or more operators. The cab 40 also includes one or more doors 44 that facilitate selective access to the cab interior 42 from outside of the vehicle 10. The cab interior 42 contains one or more components that facilitate operation of the vehicle 10 by the operator. By way of example, the cab interior 42 may contain components that facilitate operator comfort (e.g., seats, seatbelts, etc.), user interface components that receive inputs from the operators (e.g., steering wheels, pedals, touch screens, switches, buttons, levers, etc.), and/or user interface components that provide information to the operators (e.g., lights, gauges, speakers, etc.). The user interface components within the cab 40 may facilitate operator control over the drive components of the vehicle 10 and/or over any implements of the vehicle 10.

The vehicle 10 further includes a series of axle assemblies, shown as front axle 50 and rear axles 52. As shown, the vehicle 10 includes one front axle 50 coupled to the front section 22 of the chassis 20 and two rear axles 52 each coupled to the rear section 26 of the chassis 20. In other embodiments, the vehicle 10 includes more or fewer axles. By way of example, the vehicle 10 may include a tag axle that may be raised or lowered to accommodate variations in weight being carried by the vehicle 10. The front axle 50 and the rear axles 52 each include a series of tractive elements (e.g., wheels, treads, etc.), shown as wheel and tire assemblies 54. The wheel and tire assemblies 54 are configured to engage a support surface (e.g., roads, the ground, etc.) to support and propel the vehicle 10. The front axle 50 and the rear axles may include steering components (e.g., steering arms, steering actuators, etc.), suspension components (e.g., gas springs, dampeners, air springs, etc.), power transmission or drive components (e.g., differentials, drive shafts, etc.), braking components (e.g., brake actuators, brake pads, brake discs, brake drums, etc.), and/or other components that facilitate propulsion or support of the vehicle.

In some embodiments, the vehicle 10 is configured as an electric vehicle that is propelled by an electric powertrain system. Referring to FIG. 1, the vehicle 10 includes one or more electrical energy storage devices (e.g., batteries, capacitors, etc.), shown as batteries 60. As shown, the batteries 60 are positioned within the middle section 24 of the chassis 20. In other embodiments, the batteries 60 are otherwise positioned throughout the vehicle 10. The vehicle 10 further includes one or more electromagnetic devices or prime movers (e.g., motor/generators), shown as drive motors 62. The drive motors 62 are electrically coupled to the batteries 60. The drive motors 62 may be configured to receive electrical energy from the batteries 60 and provide rotational mechanical energy to the wheel and tire assemblies 54 to propel the vehicle 10. The drive motors 62 may be configured to receive rotational mechanical energy from the wheel and tire assemblies 64 and provide electrical energy to the batteries 60, providing a braking force to slow the vehicle 10.

The batteries 60 may include one or more rechargeable batteries (e.g., lithium-ion batteries, nickel-metal hydride batteries, lithium-ion polymer batteries, lead-acid batteries, nickel-cadmium batteries, etc.). The batteries 60 may be charged by one or more sources of electrical energy onboard the vehicle 10 (e.g., solar panels, etc.) or separate from the vehicle 10 (e.g., connections to an electrical power grid, a wireless charging system, etc.). As shown, the drive motors 62 are positioned within the rear axles 52 (e.g., as part of a combined axle and motor assembly). In other embodiments, the drive motors 62 are otherwise positioned within the vehicle 10.

In other embodiments, the vehicle 10 is configured as a hybrid vehicle that is propelled by a hybrid powertrain system (e.g., a diesel/electric hybrid, gasoline/electric hybrid, natural gas/electric hybrid, etc.). According to an exemplary embodiment, the hybrid powertrain system may include a primary driver (e.g., an engine, a motor, etc.), an energy generation device (e.g., a generator, etc.), and/or an energy storage device (e.g., a battery, capacitors, ultra-capacitors, etc.) electrically coupled to the energy generation device. The primary driver may combust fuel (e.g., gasoline, diesel, etc.) to provide mechanical energy, which a transmission may receive and provide to the axle front axle 50 and/or the rear axles 52 to propel the vehicle 10. Additionally or alternatively, the primary driver may provide mechanical energy to the generator, which converts the mechanical energy into electrical energy. The electrical energy may be stored in the energy storage device (e.g., the batteries 60) in order to later be provided to a motive driver.

In yet other embodiments, the chassis 20 may further be configured to support non-hybrid powertrains. For example, the powertrain system may include a primary driver that is a compression-ignition internal combustion engine that utilizes diesel fuel.

Referring to FIG. 1, the vehicle 10 includes a rear assembly, module, implement, body, or cargo area, shown as application kit 80. The application kit 80 may include one or more implements, vehicle bodies, and/or other components. Although the application kit 80 is shown positioned behind the cab 40, in other embodiments the application kit 80 extends forward of the cab 40. The vehicle 10 may be outfitted with a variety of different application kits 80 to configure the vehicle 10 for use in different applications. Accordingly, a common vehicle 10 can be configured for a variety of different uses simply by selecting an appropriate application kit 80. By way of example, the vehicle 10 may be configured as a refuse vehicle, a concrete mixer, a fire fighting vehicle, an airport fire fighting vehicle, a lift device (e.g., a boom lift, a scissor lift, a telehandler, a vertical lift, etc.), a crane, a tow truck, a military vehicle, a delivery vehicle, a mail vehicle, a boom truck, a plow truck, a farming machine or vehicle, a construction machine or vehicle, a coach bus, a school bus, a semi-truck, a passenger or work vehicle (e.g., a sedan, a SUV, a truck, a van, etc.), and/or still another vehicle. FIGS. 3-13 illustrate various examples of how the vehicle 10 may be configured for specific applications. Although only a certain set of vehicle configurations is shown, it should be understood that the vehicle 10 may be configured for use in other applications that are not shown.

The application kit 80 may include various actuators to facilitate certain functions of the vehicle 10. By way of example, the application kit 80 may include hydraulic actuators (e.g., hydraulic cylinders, hydraulic motors, etc.), pneumatic actuators (e.g., pneumatic cylinders, pneumatic motors, etc.), and/or electrical actuators (e.g., electric motors, electric linear actuators, etc.). The application kit 80 may include components that facilitate operation of and/or control of these actuators. By way of example, the application kit 80 may include hydraulic or pneumatic components that form a hydraulic or pneumatic circuit (e.g., conduits, valves, pumps, compressors, gauges, reservoirs, accumulators, etc.). By way of another example, the application kit 80 may include electrical components (e.g., batteries, capacitors, voltage regulators, motor controllers, etc.). The actuators may be powered by components of the vehicle 10. By way of example, the actuators may be powered by the batteries 60, the drive motors 62, or the primary driver (e.g., through a power take off).

The vehicle 10 generally extends longitudinally from a front side 86 to a rear side 88. The front side 86 is defined by the cab 40 and/or the chassis. The rear side 88 is defined by the application kit 80 and/or the chassis 20. The primary, forward direction of travel of the vehicle 10 is longitudinal, with the front side 86 being arranged forward of the rear side 88.

A. Front-Loading Refuse Vehicle

Figure 3:
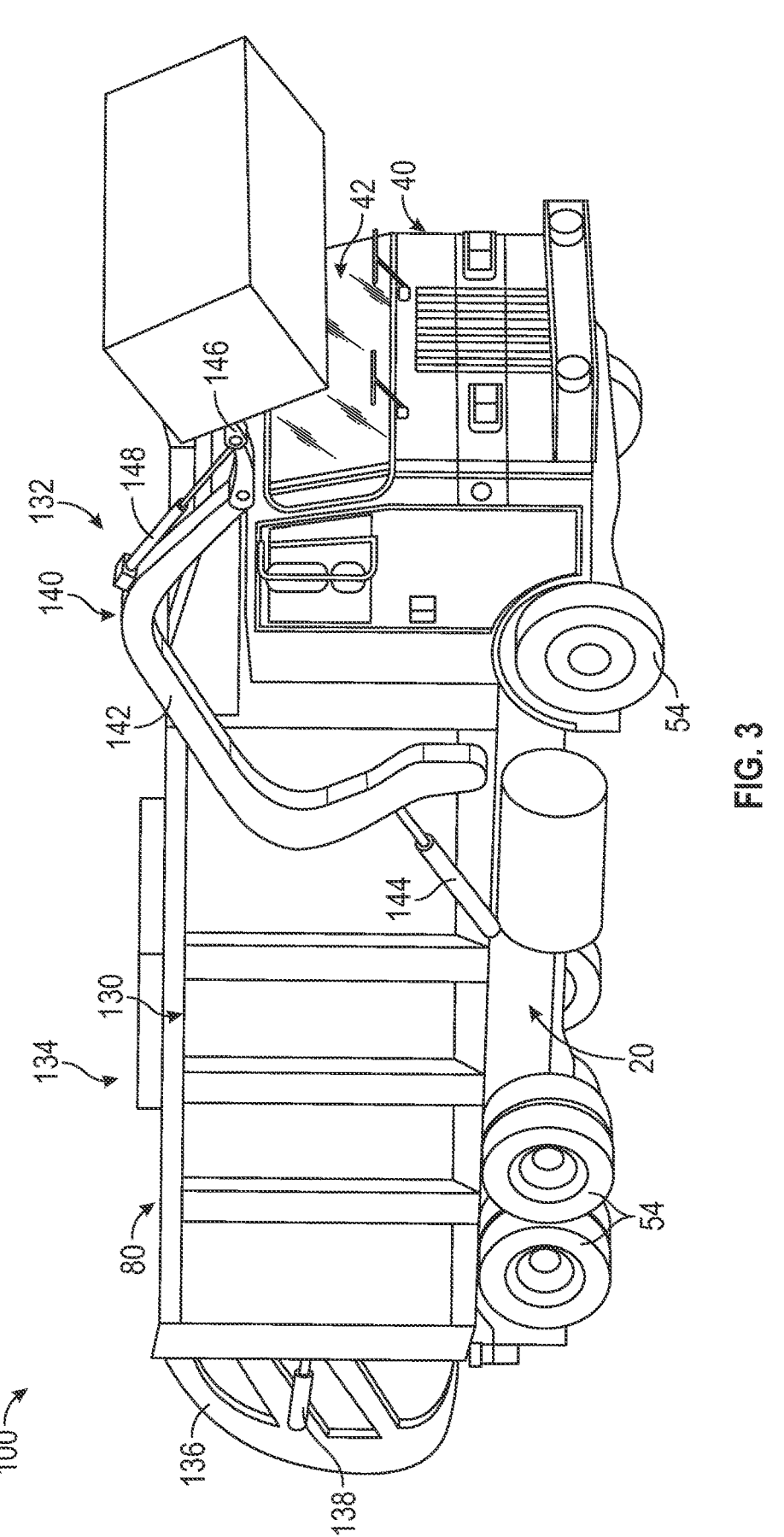
FIG. 3 is a perspective view of the vehicle of FIG. 1 configured as a front-loading refuse vehicle, according to an exemplary embodiment.
Figure 4:
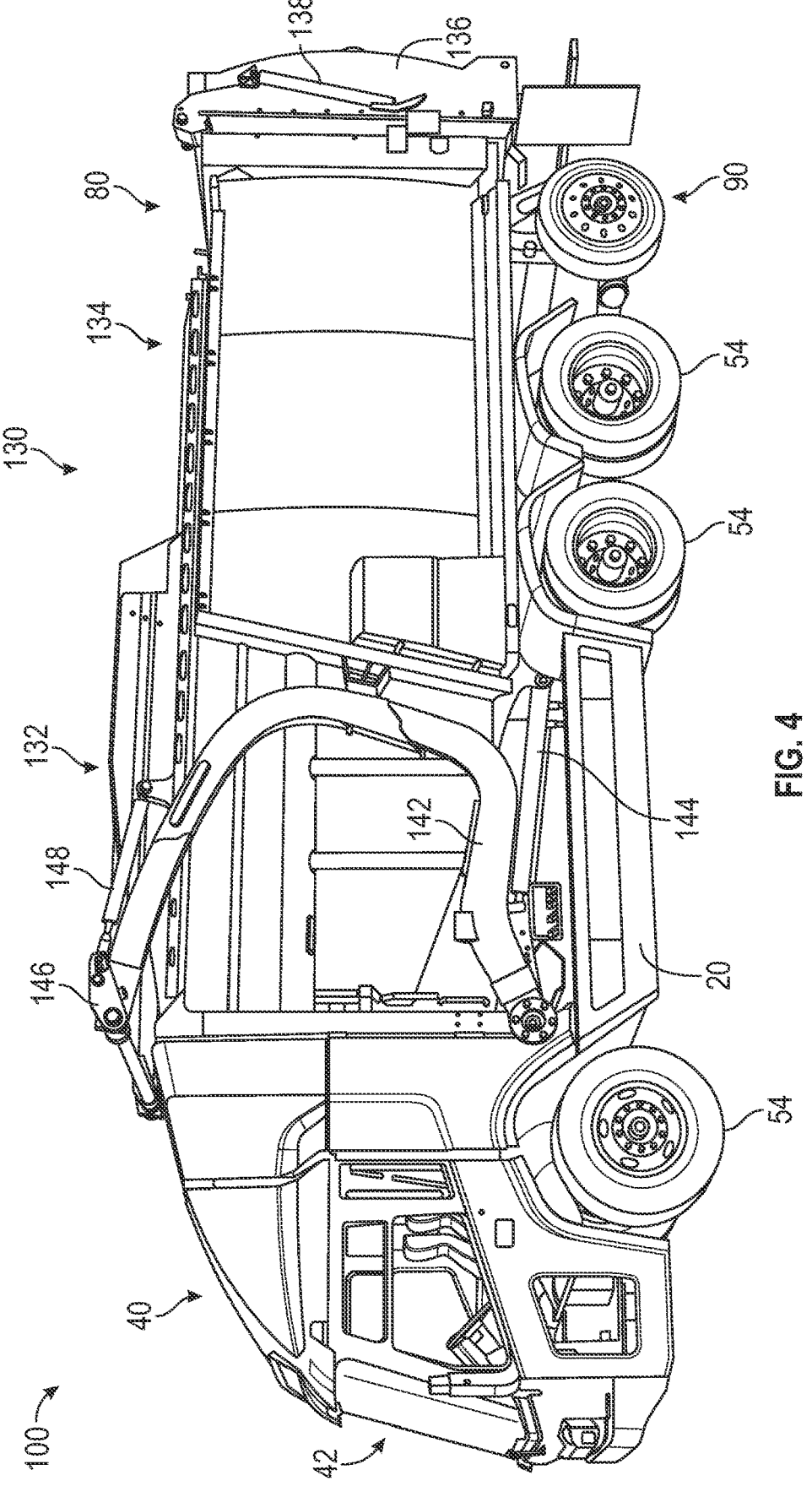
FIG. 4 is a left side view of the front-loading refuse vehicle of FIG. 3 configured with a tag axle.

Referring now to FIGS. 3 and 4, the vehicle 10 is configured as a refuse vehicle 100 (e.g., a refuse truck, a garbage truck, a waste collection truck, a sanitation truck, a recycling truck, etc.). Specifically, the refuse vehicle 100 is a front-loading refuse vehicle. In other embodiments, the refuse vehicle 100 is configured as a rear-loading refuse vehicle or a front-loading refuse vehicle. The refuse vehicle 100 may be configured to transport refuse from various waste receptacles (e.g., refuse containers) within a municipality to a storage and/or processing facility (e.g., a landfill, an incineration facility, a recycling facility, etc.).

FIG. 4 illustrates the refuse vehicle 100 of FIG. 3 configured with a liftable axle, shown as tag axle 90, including a pair of wheel and tire assemblies 54. As shown, the tag axle 90 is positioned reward of the rear axles 52. The tag axle 90 can be selectively raised and lowered (e.g., by a hydraulic actuator) to selectively engage the wheel and tire assemblies 54 of the tag axle 90 with the ground. The tag axle 90 may be raised to reduce rolling resistance experienced by the refuse vehicle 100. The tag axle 90 may be lowered to distribute the loaded weight of the vehicle 100 across a greater number of a wheel and tire assemblies 54 (e.g., when the refuse vehicle 100 is loaded with refuse).

As shown in FIGS. 3 and 4, the application kit 80 of the refuse vehicle 100 includes a series of panels that form a rear body or container, shown as refuse compartment 130. The refuse compartment 130 may facilitate transporting refuse from various waste receptacles within a municipality to a storage and/or a processing facility (e.g., a landfill, an incineration facility, a recycling facility, etc.). By way of example, loose refuse may be placed into the refuse compartment 130 where it may be compacted (e.g., by a packer system within the refuse compartment 130). The refuse compartment 130 may also provide temporary storage for refuse during transport to a waste disposal site and/or a recycling facility. In some embodiments, the refuse compartment 130 may define a hopper volume 132 and storage volume 134. In this regard, refuse may be initially loaded into the hopper volume 132 and later compacted into the storage volume 134. As shown, the hopper volume 132 is positioned between the storage volume 134 and the cab 40 (e.g., refuse is loaded into a portion of the refuse compartment 130 behind the cab 40 and stored in a portion further toward the rear of the refuse compartment 130). In other embodiments, the storage volume may be positioned between the hopper volume and the cab 40 (e.g., in a rear-loading refuse truck, etc.). The application kit 80 of the refuse vehicle 100 further includes a pivotable rear portion, shown as tailgate 136, that is pivotally coupled to the refuse compartment 130. The tailgate 136 may be selectively repositionable between a closed position and an open position by an actuator (e.g., a hydraulic cylinder, an electric linear actuator, etc.), shown as tailgate actuator 138 (e.g., to facilitate emptying the storage volume).

As shown in FIGS. 3 and 4, the refuse vehicle 100 also includes an implement, shown as lift assembly 140, which is a front-loading lift assembly. According to an exemplary embodiment, the lift assembly 140 includes a pair of lift arms 142 and a pair of actuators (e.g., hydraulic cylinders, electric linear actuators, etc.), shown as lift arm actuators 144. The lift arms 142 may be rotatably coupled to the chassis 20 and/or the refuse compartment 130 on each side of the refuse vehicle 100 (e.g., through a pivot, a lug, a shaft, etc.), such that the lift assembly 140 may extend forward relative to the cab 40 (e.g., a front-loading refuse truck, etc.). In other embodiments, the lift assembly 140 may extend rearward relative to the application kit 80 (e.g., a rear-loading refuse truck). As shown in FIGS. 3 and 4, in an exemplary embodiment the lift arm actuators 144 may be positioned such that extension and retraction of the lift arm actuators 144 rotates the lift arms 142 about an axis extending through the pivot. In this regard, the lift arms 142 may be rotated by the lift arm actuators 144 to lift a refuse container over the cab 40. The lift assembly 140 further includes a pair of interface members, shown as lift forks 146, each pivotally coupled to a distal end of one of the lift arms 142. The lift forks 146 may be configured to engage a refuse container (e.g., a dumpster) to selectively coupled the refuse container to the lift arms 142. By way of example, each of the lift forks 146 may be received within a corresponding pocket defined by the refuse container. A pair of actuators (e.g., hydraulic cylinders, electric linear actuators, etc.), shown as articulation actuators 148, are each coupled to one of the lift arms 142 and one of the lift forks 146. The articulation actuators 148 may be positioned to rotate the lift forks 146 relative to the lift arms 142 about a horizontal axis. Accordingly, the articulation actuators 148 may assist in tipping refuse out of the refuse container and into the refuse compartment 130. The lift arm actuators 144 may then rotate the lift arms 142 to return the empty refuse container to the ground.

B. Side-Loading Refuse Vehicle

Figure 5:
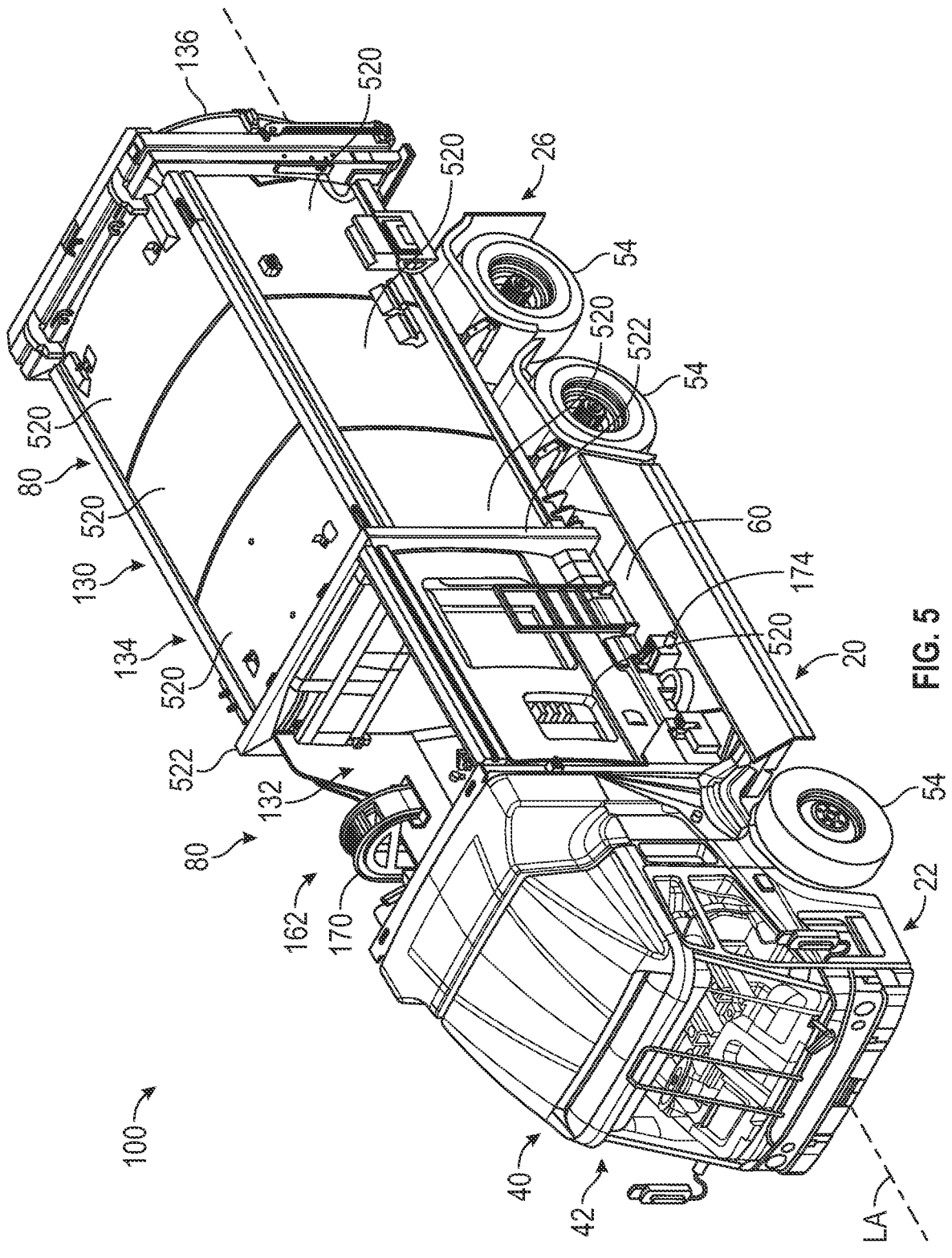
FIG. 5 is a perspective view of the vehicle of FIG. 1 configured as a side-loading refuse vehicle, according to an exemplary embodiment.
Figure 6:
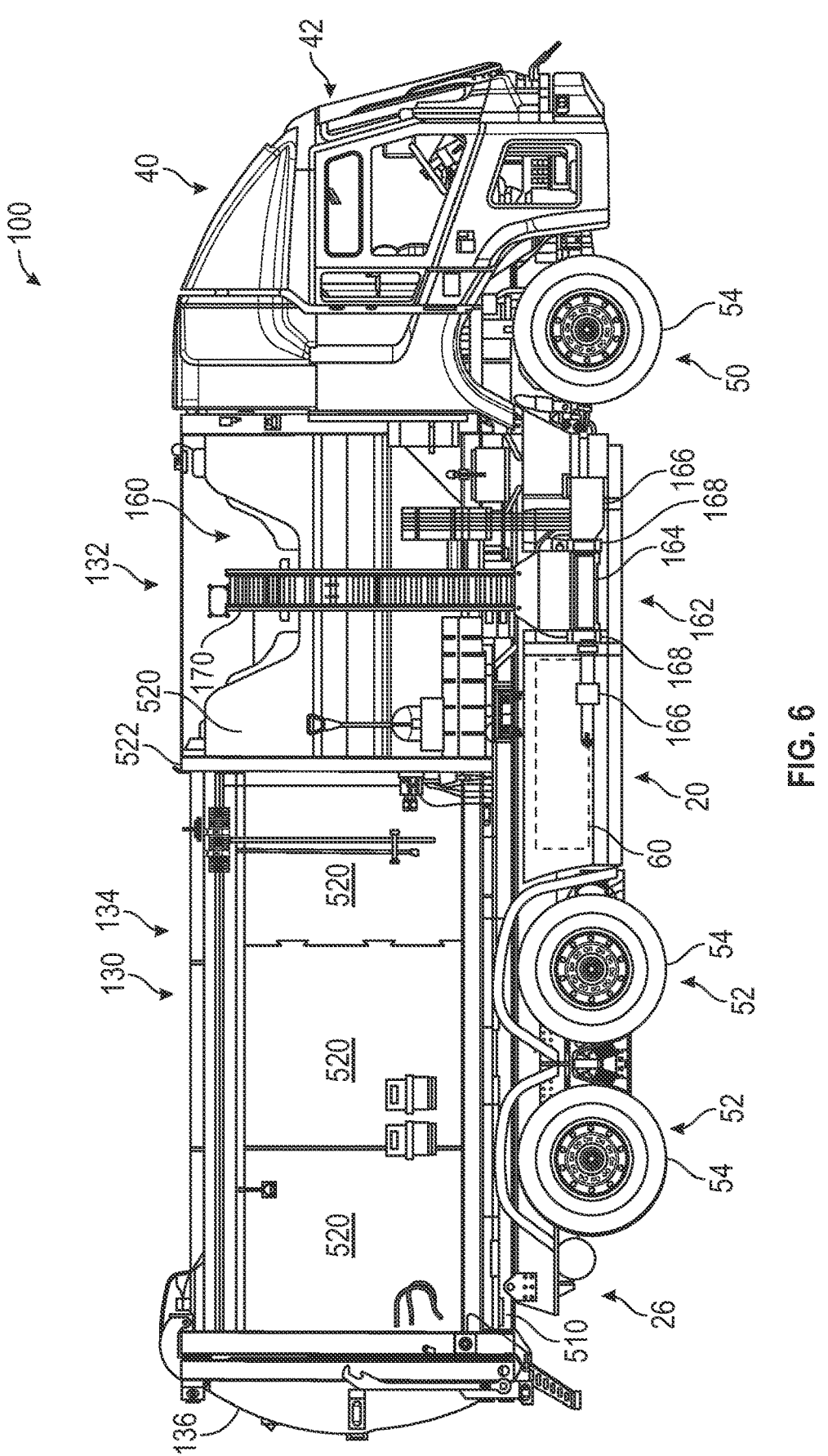
FIG. 6 is a right side view of the side-loading refuse vehicle of FIG. 5.
Figure 7:
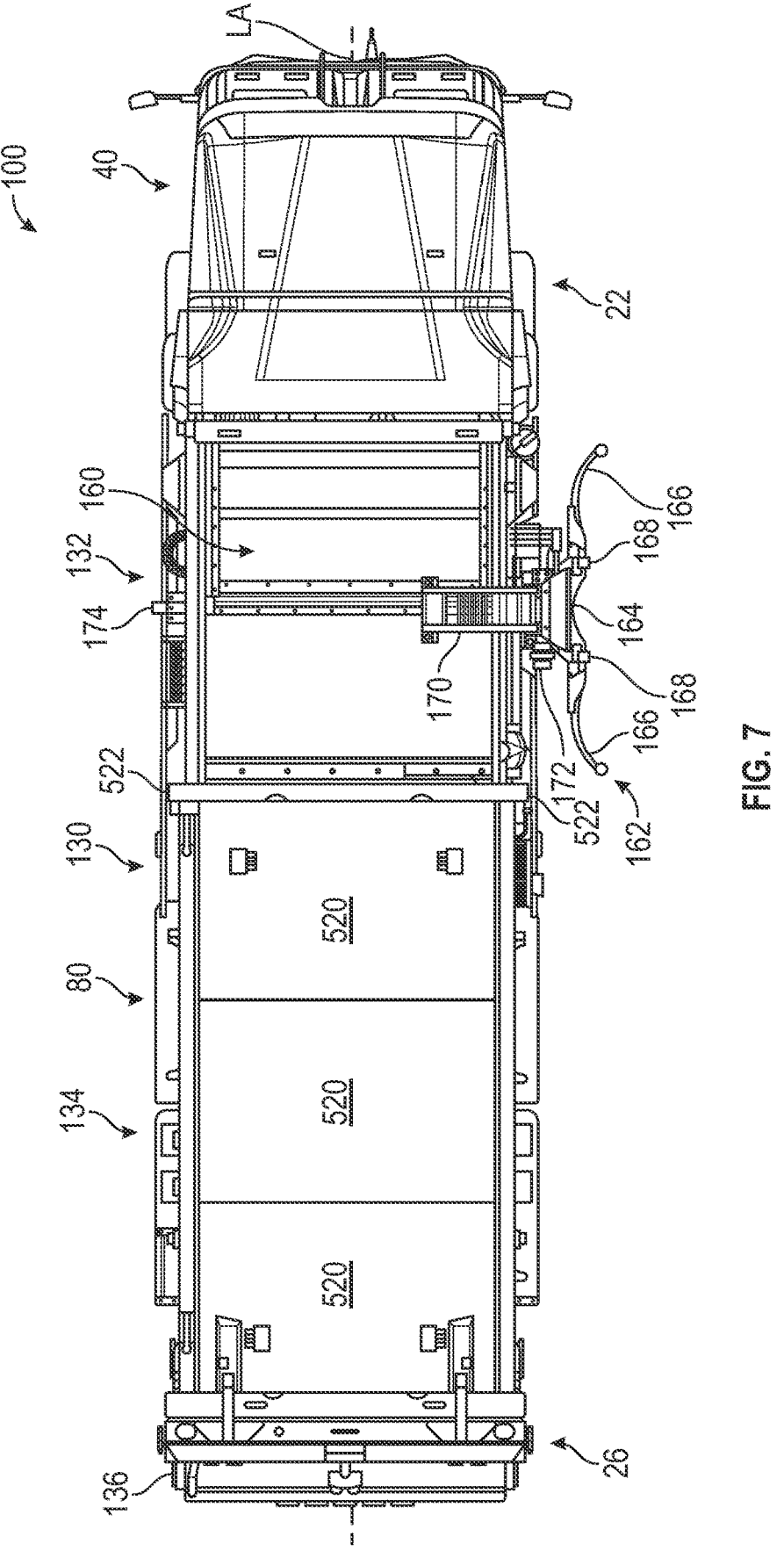
FIG. 7 is a top view of the side-loading refuse vehicle of FIG. 5.
Figure 8:
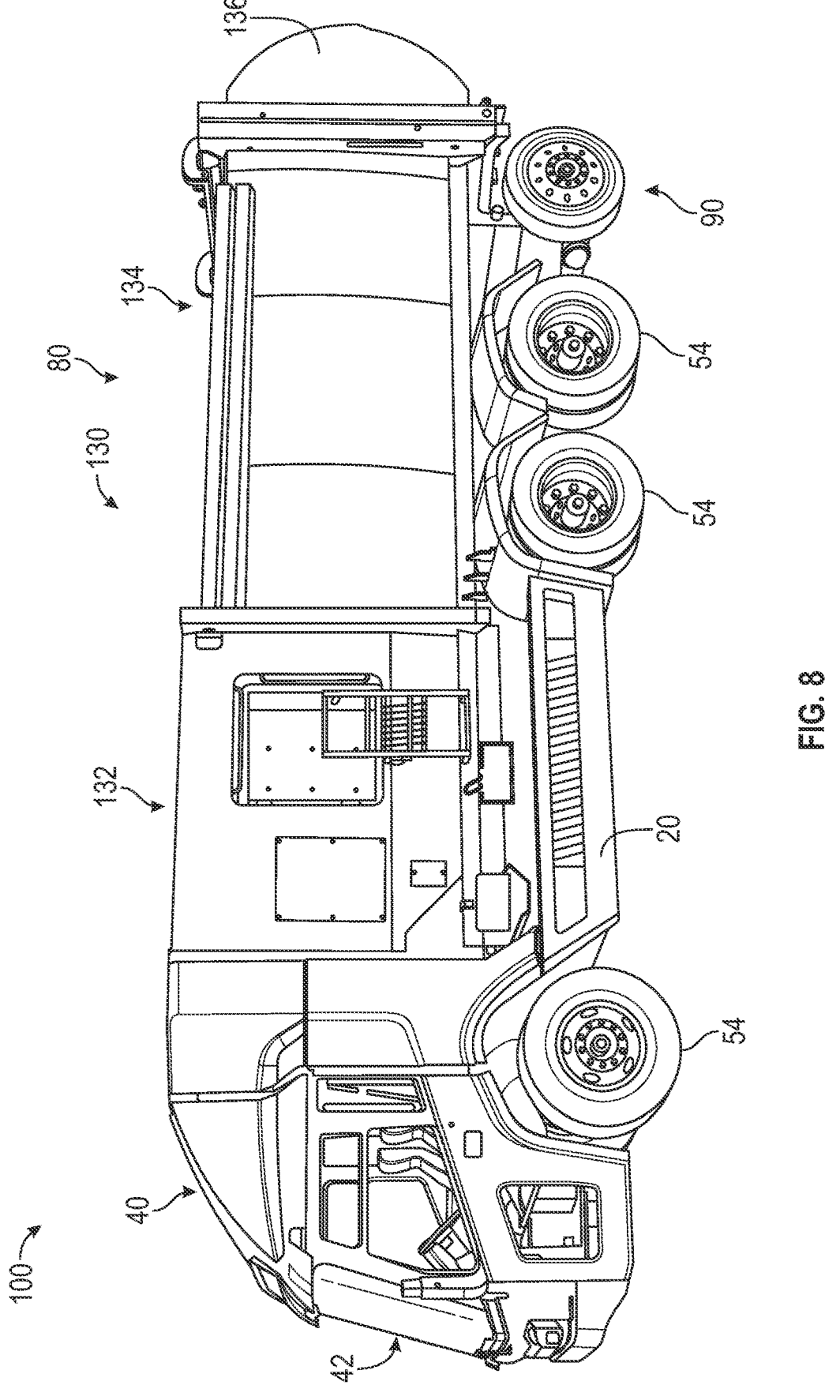
FIG. 8 is a left side view of the side-loading refuse vehicle of FIG. 5 configured with a tag axle.

Referring now to FIGS. 5-8, an alternative configuration of the refuse vehicle 100 is shown according to an exemplary embodiment. Specifically, the refuse vehicle 100 of FIGS. 5-8 is configured as a side-loading refuse vehicle. The refuse vehicle 100 of FIGS. 5-8 may be substantially similar to the front-loading refuse vehicle 100 of FIGS. 3 and 4 except as otherwise specified herein. As shown, the refuse vehicle 100 of FIGS. 5-7 is configured with a tag axle 90 in FIG. 8.

Referring still to FIGS. 5-8, the refuse vehicle 100 omits the lift assembly 140 and instead includes a side-loading lift assembly, shown as lift assembly 160, that extends laterally outward from a side of the refuse vehicle 100. The lift assembly 160 includes an interface assembly, shown as grabber assembly 162, that is configured to engage a refuse container (e.g., a residential garbage can) to selectively couple the refuse container to the lift assembly 160. The grabber assembly 162 includes a main portion, shown as main body 164, and a pair of fingers or interface members, shown as grabber fingers 166. The grabber fingers 166 are pivotally coupled to the main body 164 such that the grabber fingers 166 are each rotatable about a vertical axis. A pair of actuators (e.g., hydraulic motors, electric motors, etc.), shown as finger actuators 168, are configured to control movement of the grabber fingers 166 relative to the main body 164.

The grabber assembly 162 is movably coupled to a guide, shown as track 170, that extends vertically along a side of the refuse vehicle 100. Specifically, the main body 164 is slidably coupled to the track 170 such that the main body 164 is repositionable along a length of the track 170. An actuator (e.g., a hydraulic motor, an electric motor, etc.), shown as lift actuator 172, is configured to control movement of the grabber assembly 162 along the length of the track 170. In some embodiments, a bottom end portion of the track 170 is straight and substantially vertical such that the grabber assembly 162 raises or lowers a refuse container when moving along the bottom end portion of the track 170. In some embodiments, a top end portion of the track 170 is curved such that the grabber assembly 162 inverts a refuse container to dump refuse into the hopper volume 132 when moving along the top end portion of the track 170.

The lift assembly 160 further includes an actuator (e.g., a hydraulic cylinder, an electric linear actuator, etc.), shown as track actuator 174, that is configured to control lateral movement of the grabber assembly 162. By way of example, the track actuator 174 may be coupled to the chassis 20 and the track 170 such that the track actuator 174 moves the track 170 and the grabber assembly 162 laterally relative to the chassis 20. The track actuator 174 may facilitate repositioning the grabber assembly 162 to pick up and replace refuse containers that are spaced laterally outward from the refuse vehicle 100.

C. Concrete Mixer Truck

Figure 9:
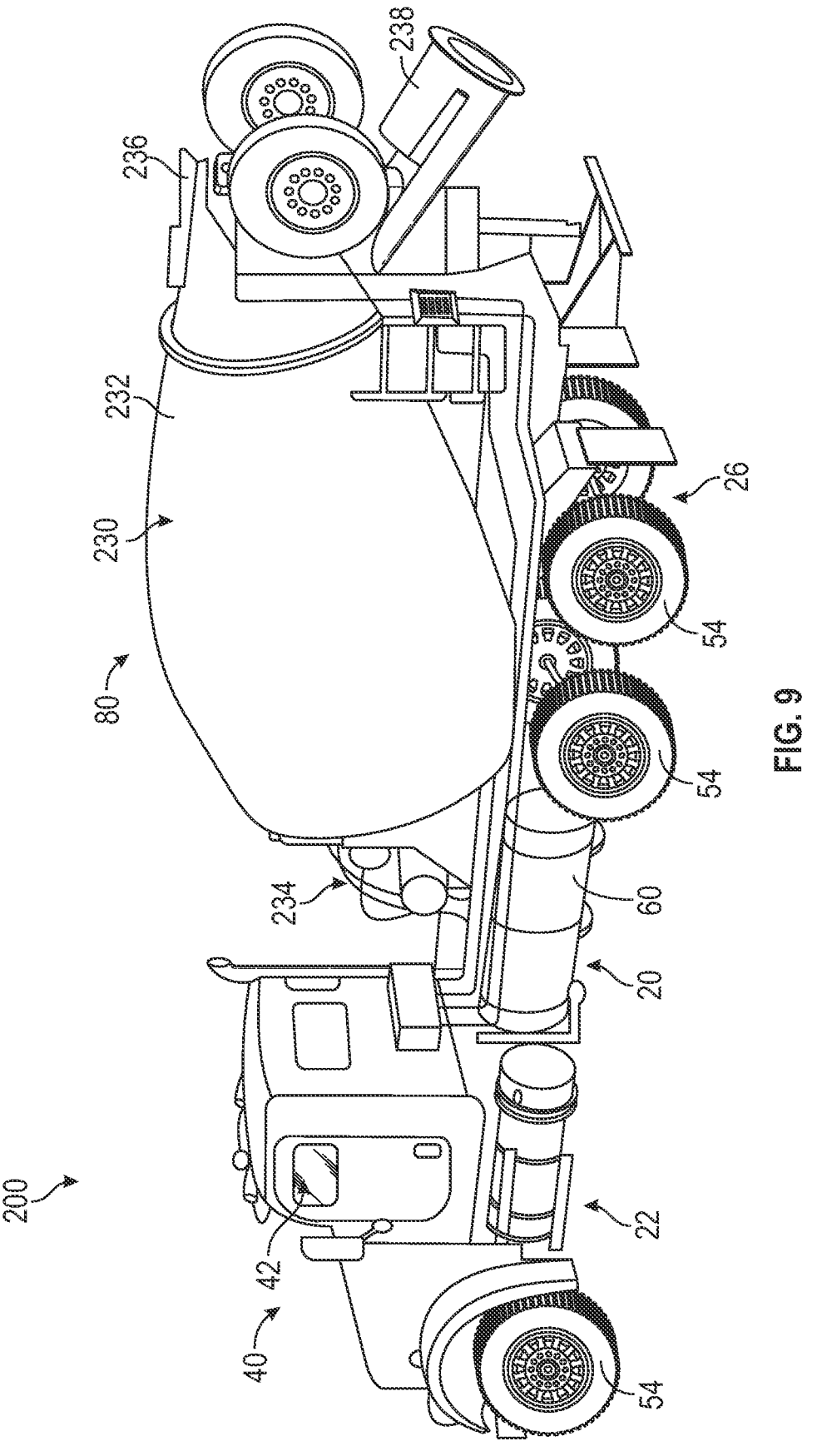
FIG. 9 is a perspective view of the vehicle of FIG. 1 configured as a mixer vehicle, according to an exemplary embodiment.

Referring now to FIG. 9, the vehicle 10 is configured as a mixer truck (e.g., a concrete mixer truck, a mixer vehicle, etc.), shown as mixer truck 200. Specifically, the mixer truck 200 is shown as a rear-discharge concrete mixer truck. In other embodiments, the mixer truck 200 is a front-discharge concrete mixer truck.

As shown in FIG. 9, the application kit 80 includes a mixing drum assembly (e.g., a concrete mixing drum), shown as drum assembly 230. The drum assembly 230 may include a mixing drum 232, a drum drive system 234 (e.g., a rotational actuator or motor, such as an electric motor or hydraulic motor), an inlet portion, shown as hopper 236, and an outlet portion, shown as chute 238. The mixing drum 232 may be coupled to the chassis 20 and may be disposed behind the cab 40 (e.g., at the rear and/or middle of the chassis 20). In an exemplary embodiment, the drum drive system 234 is coupled to the chassis 20 and configured to selectively rotate the mixing drum 232 about a central, longitudinal axis. According to an exemplary embodiment, the central, longitudinal axis of the mixing drum 232 may be elevated from the chassis 20 (e.g., from a horizontal plan extending along the chassis 20) at an angle in the range of five degrees to twenty degrees. In other embodiments, the central, longitudinal axis may be elevated by less than five degrees (e.g., four degrees, etc.). In yet another embodiment, the mixer truck 200 may include an actuator positioned to facilitate adjusting the central, longitudinal axis to a desired or target angle (e.g., manually in response to an operator input/command, automatically according to a control system, etc.).

The mixing drum 232 may be configured to receive a mixture, such as a concrete mixture (e.g., cementitious material, aggregate, sand, etc.), through the hopper 236. In some embodiments, the mixer truck 200 includes an injection system (e.g., a series of nozzles, hoses, and/or valves) including an injection valve that selectively fluidly couples a supply of fluid to the inner volume of the mixing drum 232. By way of example, the injection system may be used to inject water and/or chemicals (e.g., air entrainers, water reducers, set retarders, set accelerators, superplasticizers, corrosion inhibitors, coloring, calcium chloride, minerals, and/or other concrete additives, etc.) into the mixing drum 232. The injection valve may facilitate injecting water and/or chemicals from a fluid reservoir (e.g., a water tank, etc.) into the mixing drum 232, while preventing the mixture in the mixing drum 232 from exiting the mixing drum 232 through the injection system. In some embodiments, one or more mixing elements (e.g., fins, etc.) may be positioned in the interior of the mixing drum 232, and may be configured to agitate the contents of the mixture when the mixing drum 232 is rotated in a first direction (e.g., counterclockwise, clockwise, etc.), and drive the mixture out through the chute 238 when the mixing drum 232 is rotated in a second direction (e.g., clockwise, counterclockwise, etc.). In some embodiments, the chute 238 may also include an actuator positioned such that the chute 238 may be selectively pivotable to position the chute 238 (e.g., vertically, laterally, etc.), for example at an angle at which the mixture is expelled from the mixing drum 232.

D. Fire Truck

Figure 10:
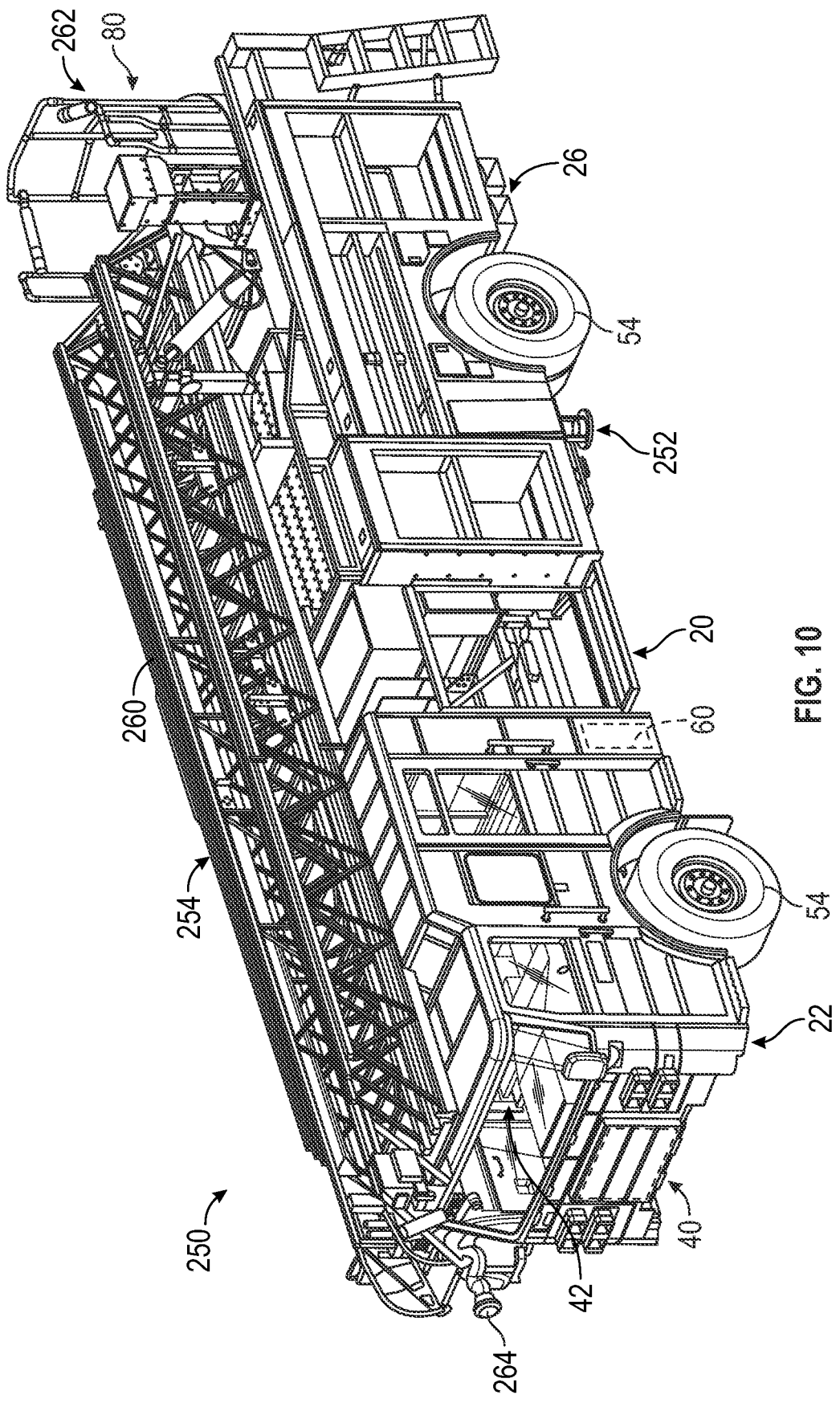
FIG. 10 is a perspective view of the vehicle of FIG. 1 configured as a fire fighting vehicle, according to an exemplary embodiment.

Referring now to FIG. 10, the vehicle 10 is configured as a fire fighting vehicle, fire truck, or fire apparatus (e.g., a turntable ladder truck, a pumper truck, a quint, etc.), shown as fire fighting vehicle 250. In the embodiment shown in FIG. 10, the fire fighting vehicle 250 is configured as a rear-mount aerial ladder truck. In other embodiments, the fire fighting vehicle 250 is configured as a mid-mount aerial ladder truck, a quint fire truck (e.g., including an on-board water storage, a hose storage, a water pump, etc.), a tiller fire truck, a pumper truck (e.g., without an aerial ladder), or another type of response vehicle. By way of example, the vehicle 10 may be configured as a police vehicle, an ambulance, a tow truck, or still other vehicles used for responding to a scene (e.g., an accident, a fire, an incident, etc.).

As shown in FIG. 10, in the fire fighting vehicle 250, the application kit 80 is positioned mainly rearward from the cab 40. The application kit 80 includes deployable stabilizers (e.g., outriggers, downriggers, etc.), shown as outriggers 252, that are coupled to the chassis 20. The outriggers 252 may be configured to selectively extend from each lateral side and/or the rear of the fire fighting vehicle 250 and engage a support surface (e.g., the ground) in order to provide increased stability while the fire fighting vehicle 250 is stationary. The fire fighting vehicle 250 further includes an extendable or telescoping ladder assembly, shown as ladder assembly 254. The increased stability provided by the outriggers 252 is desirable when the ladder assembly 254 is in use (e.g., extended from the fire fighting vehicle 250) to prevent tipping. In some embodiments, the application kit 80 further includes various storage compartments (e.g., cabinets, lockers, etc.) that may be selectively opened and/or accessed for storage and/or component inspection, maintenance, and/or replacement.

As shown in FIG. 10, the ladder assembly 254 includes a series of ladder sections 260 that are slidably coupled with one another such that the ladder sections 260 may extend and/or retract (e.g., telescope) relative to one another to selectively vary a length of the ladder assembly 254. A base platform, shown as turntable 262, is rotatably coupled to the chassis 20 and to a proximal end of a base ladder section 260 (i.e., the most proximal of the ladder sections 260). The turntable 262 may be configured to rotate about a vertical axis relative to the chassis 20 to rotate the ladder sections 260 about the vertical axis (e.g., up to 360 degrees, etc.). The ladder sections 260 may rotate relative to the turntable 262 about a substantially horizontal axis to selectively raise and lower the ladder sections 260 relative to the chassis 20. As shown, a water turret or implement, shown as monitor 264, is coupled to a distal end of a fly ladder section 260 (i.e., the most distal of the ladder sections 260). The monitor 264 may be configured to expel water and/or a fire suppressing agent (e.g., foam, etc.) from a water storage tank and/or an agent tank onboard the fire fighting vehicle 250, and/or from an external source (e.g., a fire hydrant, a separate water/pumper truck, etc.). In some embodiments, the ladder assembly 254 further includes an aerial platform coupled to the distal end of the fly ladder section 260 and configured to support one or more operators.

E. ARFF Truck

Figure 11:
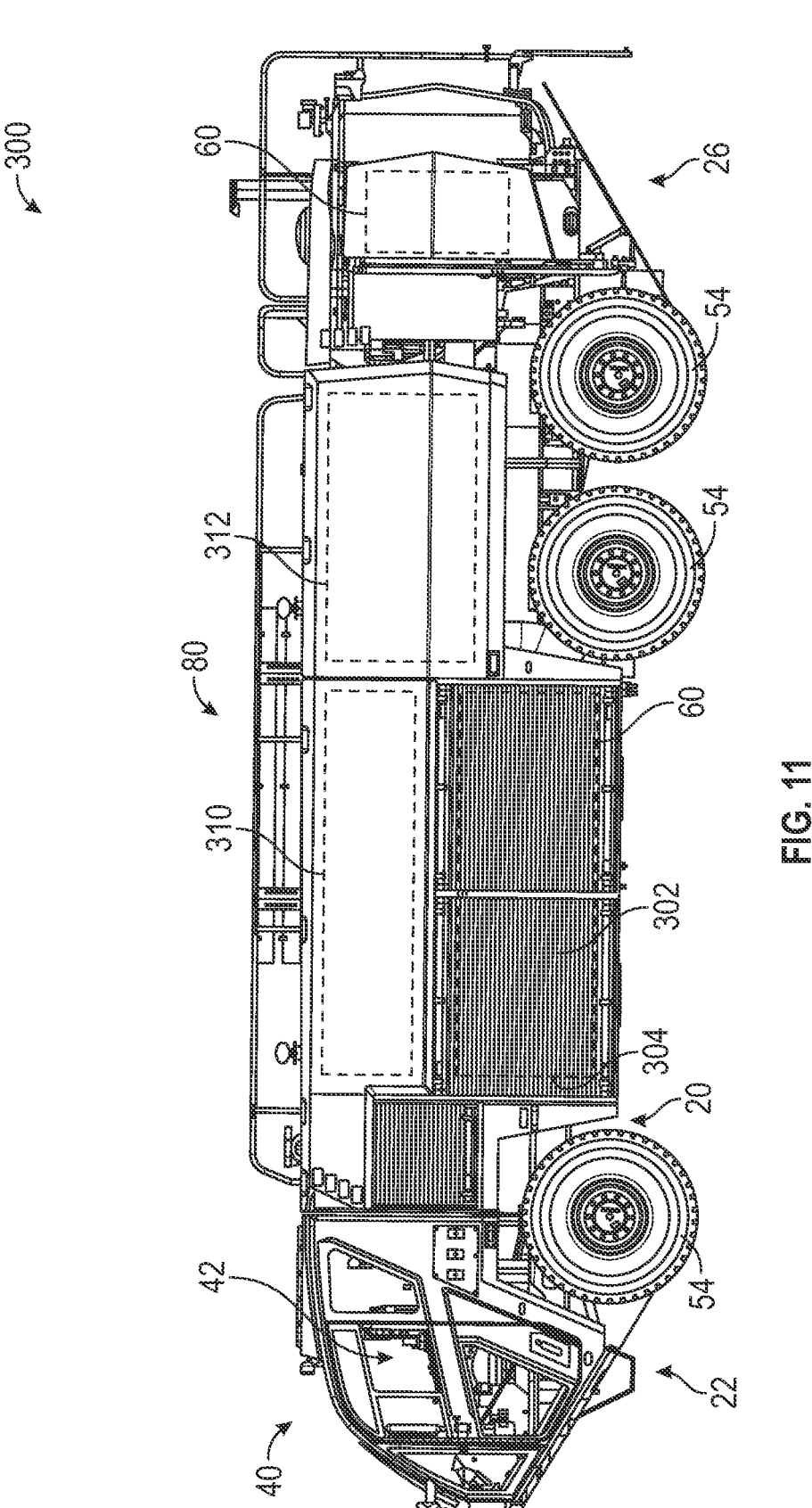
FIG. 11 is a left side view of the vehicle of FIG. 1 configured as an airport fire fighting vehicle, according to an exemplary embodiment.

Referring now to FIG. 11, the vehicle 10 is configured as a fire fighting vehicle, shown as airport rescue and fire fighting (ARFF) truck 300. As shown in FIG. 11, the application kit 80 is positioned primarily rearward of the cab 40. As shown, the application kit 80 includes a series of storage compartments or cabinets, shown as compartments 302, that are coupled to the chassis 20. The compartments 302 may store various equipment or components of the ARFF truck 300.

The application kit 80 includes a pump system 304 (e.g., an ultra-high-pressure pump system, etc.) positioned within one of the compartments 302 near the center of the ARFF truck 300. The application kit 80 further includes a water tank 310, an agent tank 312, and an implement or water turret, shown as monitor 314. The pump system 304 may include a high pressure pump and/or a low pressure pump, which may be fluidly coupled to the water tank 310 and/or the agent tank 312. The pump system 304 may to pump water and/or fire suppressing agent from the water tank 310 and the agent tank 312, respectively, to the monitor 314. The monitor 314 may be selectively reoriented by an operator to adjust a direction of a stream of water and/or agent. As shown in FIG. 11, the monitor 314 is coupled to a front end of the cab 40.

F. Boom Lift

Figure 12:
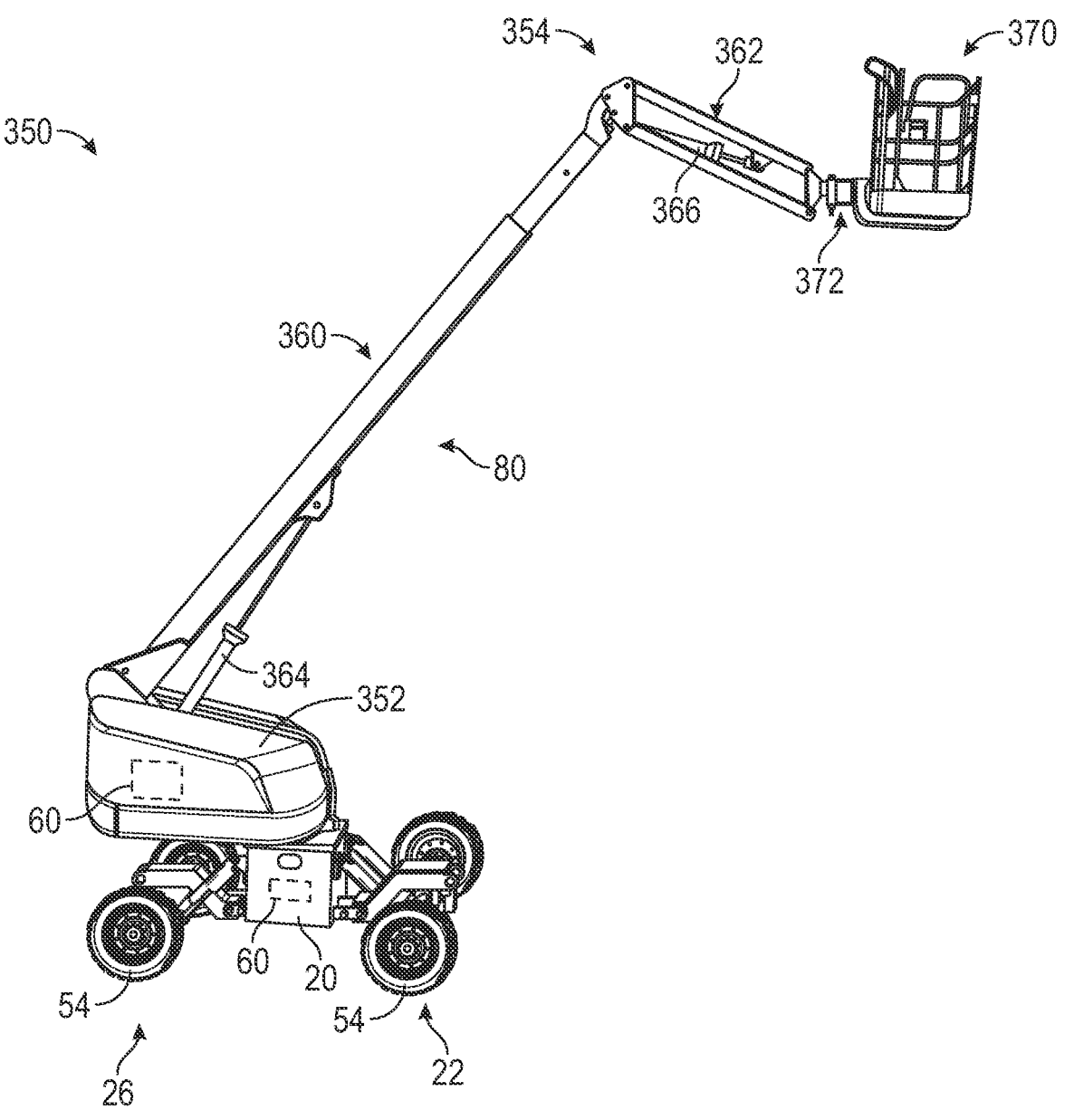
FIG. 12 is a perspective view of the vehicle of FIG. 1 configured as a boom lift, according to an exemplary embodiment.

Referring now to FIG. 12, the vehicle 10 is configured as a lift device, shown as boom lift 350. The boom lift 350 may be configured to support and elevate one or more operators. In other embodiments, the vehicle 10 is configured as another type of lift device that is configured to lift operators and/or material, such as a skid-loader, a telehandler, a scissor lift, a fork lift, a vertical lift, and/or any other type of lift device or machine.

As shown in FIG. 12, the application kit 80 includes a base assembly, shown as turntable 352, that is rotatably coupled to the chassis 20. The turntable 352 may be configured to selectively rotate relative to the chassis 20 about a substantially vertical axis. In some embodiments, the turntable 352 includes a counterweight (e.g., the batteries) positioned near the rear of the turntable 352. The turntable 352 is rotatably coupled to a lift assembly, shown as boom assembly 354. The boom assembly 354 includes a first section or telescoping boom section, shown as lower boom 360. The lower boom 360 includes a series of nested boom sections that extend and retract (e.g., telescope) relative to one another to vary a length of the boom assembly 354. The boom assembly 354 further includes a second boom section or four bar linkage, shown as upper boom 362. The upper boom 362 may includes structural members that rotate relative to one another to raise and lower a distal end of the boom assembly 354. In other embodiments, the boom assembly 354 includes more or fewer boom sections (e.g., one, three, five, etc.) and/or a different arrangement of boom sections.

As shown in FIG. 12, the boom assembly 354 includes a first actuator, shown as lower lift cylinder 364. The lower boom 360 is pivotally coupled (e.g., pinned, etc.) to the turntable 352 at a joint or lower boom pivot point. The lower lift cylinder 364 (e.g., a pneumatic cylinder, an electric linear actuator, a hydraulic cylinder, etc.) is coupled to the turntable 352 at a first end and coupled to the lower boom 360 at a second end. The lower lift cylinder 364 may be configured to raise and lower the lower boom 360 relative to the turntable 352 about the lower boom pivot point.

The boom assembly 354 further includes a second actuator, shown as upper lift cylinder 366. The upper boom 362 is pivotally coupled (e.g., pinned) to the upper end of the lower boom 360 at a joint or upper boom pivot point. The upper lift cylinder 366 (e.g., a pneumatic cylinder, an electric linear actuator, a hydraulic cylinder, etc.) is coupled to the upper boom 362. The upper lift cylinder 366 may be configured to extend and retract to actuate (e.g., lift, rotate, elevate, etc.) the upper boom 362, thereby raising and lowering a distal end of the upper boom 362.

Referring still to FIG. 12, the application kit 80 further includes an operator platform, shown as platform assembly 370, coupled to the distal end of the upper boom 362 by an extension arm, shown as jib arm 372. The jib arm 372 may be configured to pivot the platform assembly 370 about a lateral axis (e.g., to move the platform assembly 370 up and down, etc.) and/or about a vertical axis (e.g., to move the platform assembly 370 left and right, etc.).

The platform assembly 370 provides a platform configured to support one or more operators or users. In some embodiments, the platform assembly 370 may include accessories or tools configured for use by the operators. For example, the platform assembly 370 may include pneumatic tools (e.g., an impact wrench, airbrush, nail gun, ratchet, etc.), plasma cutters, welders, spotlights, etc. In some embodiments, the platform assembly 370 includes a control panel (e.g., a user interface, a removable or detachable control panel, etc.) configured to control operation of the boom lift 350 (e.g., the turntable 352, the boom assembly 354, etc.) from the platform assembly 370 or remotely. In other embodiments, the platform assembly 370 is omitted, and the boom lift 350 includes an accessory and/or tool (e.g., forklift forks, etc.) coupled to the distal end of the boom assembly 354.

G. Scissor Lift

Figure 13:
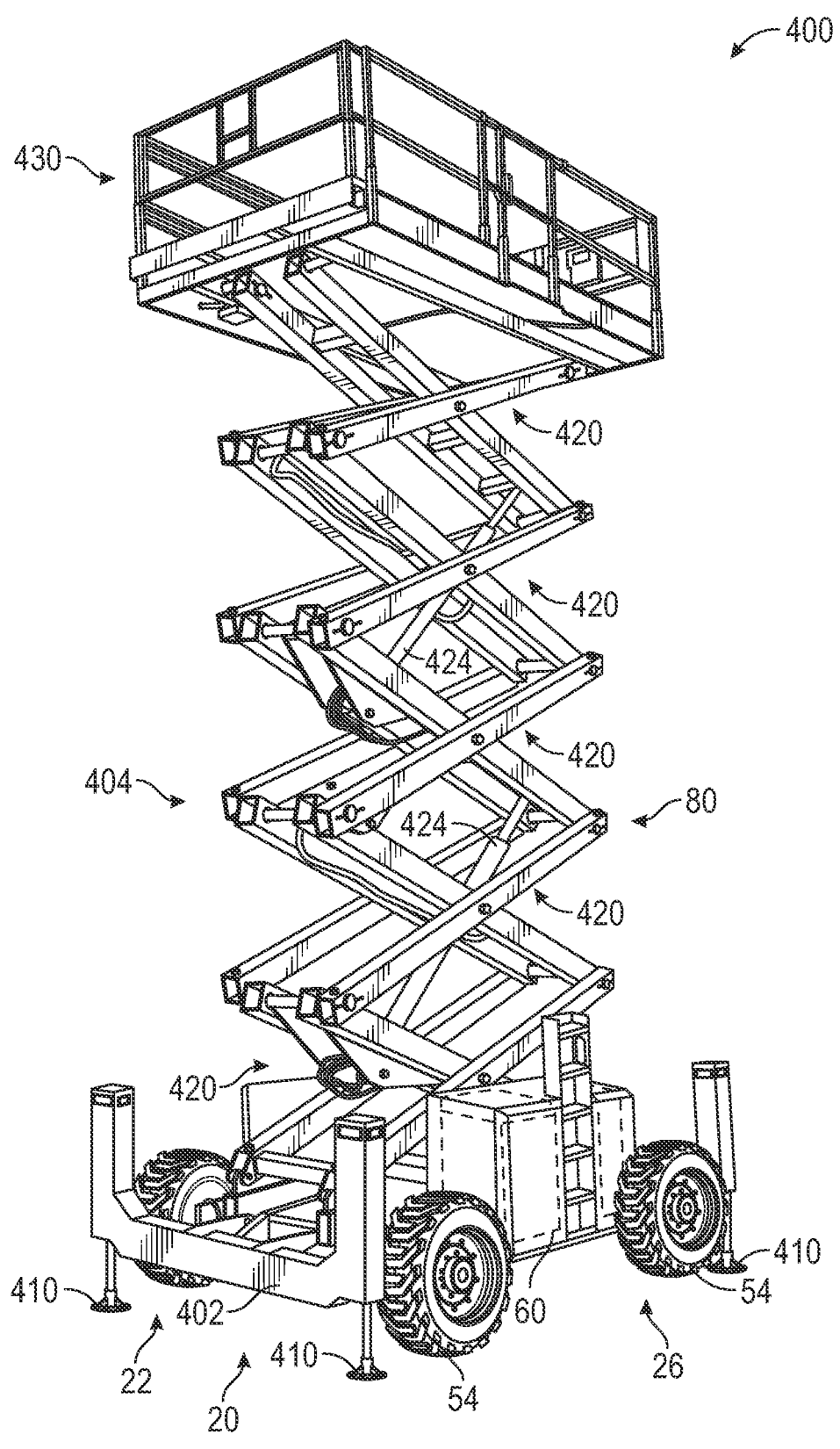
FIG. 13 is a perspective view of the vehicle of FIG. 1 configured as a scissor lift, according to an exemplary embodiment.

Referring now to FIG. 13, the vehicle 10 is configured as a lift device, shown as scissor lift 400. As shown in FIG. 13, the application kit 80 includes a body, shown as lift base 402, coupled to the chassis 20. The lift base 402 is coupled to a scissor assembly, shown as lift assembly 404, such that the lift base 402 supports the lift assembly 404. The lift assembly 404 is configured to extend and retract, raising and lowering between a raised position and a lowered position relative to the lift base 402.

As shown in FIG. 13, the lift base 402 includes a series of actuators, stabilizers, downriggers, or outriggers, shown as leveling actuators 410. The leveling actuators 410 may extend and retract vertically between a stored position and a deployed position. In the stored position, the leveling actuators 410 may be raised, such that the leveling actuators 410 do not contact the ground. Conversely, in the deployed position, the leveling actuators 410 may engage the ground to lift the lift base 402. The length of each of the leveling actuators 410 in their respective deployed positions may be varied in order to adjust the pitch (e.g., rotational position about a lateral axis) and the roll (e.g., rotational position about a longitudinal axis) of the lift base 402 and/or the chassis 20. Accordingly, the lengths of the leveling actuators 410 in their respective deployed positions may be adjusted to level the lift base 402 with respect to the direction of gravity (e.g., on uneven, sloped, pitted, etc. terrain). The leveling actuators 410 may lift the wheel and tire assemblies 54 off of the ground to prevent movement of the scissor lift 400 during operation. In other embodiments, the leveling actuators 410 are omitted.

The lift assembly 404 may include a series of subassemblies, shown as scissor layers 420, each including a pair of inner members and a pair of outer members pivotally coupled to one another. The scissor layers 420 may be stacked atop one another in order to form the lift assembly 404, such that movement of one scissor layer 420 causes a similar movement in all of the other scissor layers 420. The scissor layers 420 extend between and couple the lift base 402 and an operator platform (e.g., the platform assembly 430). In some embodiments, scissor layers 420 may be added to, or removed from, the lift assembly 404 in order to increase, or decrease, the fully extended height of the lift assembly 404.

Referring still to FIG. 13, the lift assembly 404 may also include one or more lift actuators 424 (e.g., hydraulic cylinders, pneumatic cylinders, electric linear actuators such as motor-driven leadscrews, etc.) configured to extend and retract the lift assembly 404. The lift actuators 424 may be pivotally coupled to inner members of various scissor layers 420, or otherwise arranged within the lift assembly 404.

A distal or upper end of the lift assembly 404 is coupled to an operator platform, shown as platform assembly 430. The platform assembly 430 may perform similar functions to the platform assembly 370, such as supporting one or more operators, accessories, and/or tools. The platform assembly 430 may include a control panel to control operation of the scissor lift 400. The lift actuators 424 may be configured to actuate the lift assembly 404 to selectively reposition the platform assembly 430 between a lowered position (e.g., where the platform assembly 430 is proximate to the lift base 402) and a raised position (e.g., where the platform assembly 430 is at an elevated height relative to the lift base 402). Specifically, in some embodiments, extension of the lift actuators 424 moves the platform assembly 430 upward (e.g., extending the lift assembly 404), and retraction of the lift actuators 424 moves the platform assembly 430 downward (e.g., retracting the lift assembly 404). In other embodiments, extension of the lift actuators 424 retracts the lift assembly 404, and retraction of the lift actuators 424 extends the lift assembly 404.

Body Mounting Configuration

Referring to FIGS. 14-21, additional views of the side-loading refuse vehicle 100 of FIGS. 5-7 are provided. Specifically, FIGS. 14-21 illustrate the mounting configuration of the refuse compartment 130 to the chassis 20. While FIGS. 14-21 illustrate the mounting configuration implemented with a side-loading refuse vehicle, it should be understood that similar mounting configurations may be utilized with any type of vehicle including a body mounted to a frame. By way of example, the mounting configuration may be utilized in a front-loading refuse vehicle. By way of another example, the mounting configuration may be utilized in a fire truck, a concrete mixer truck, a lift device, or any other type of vehicle.

Figure 14:
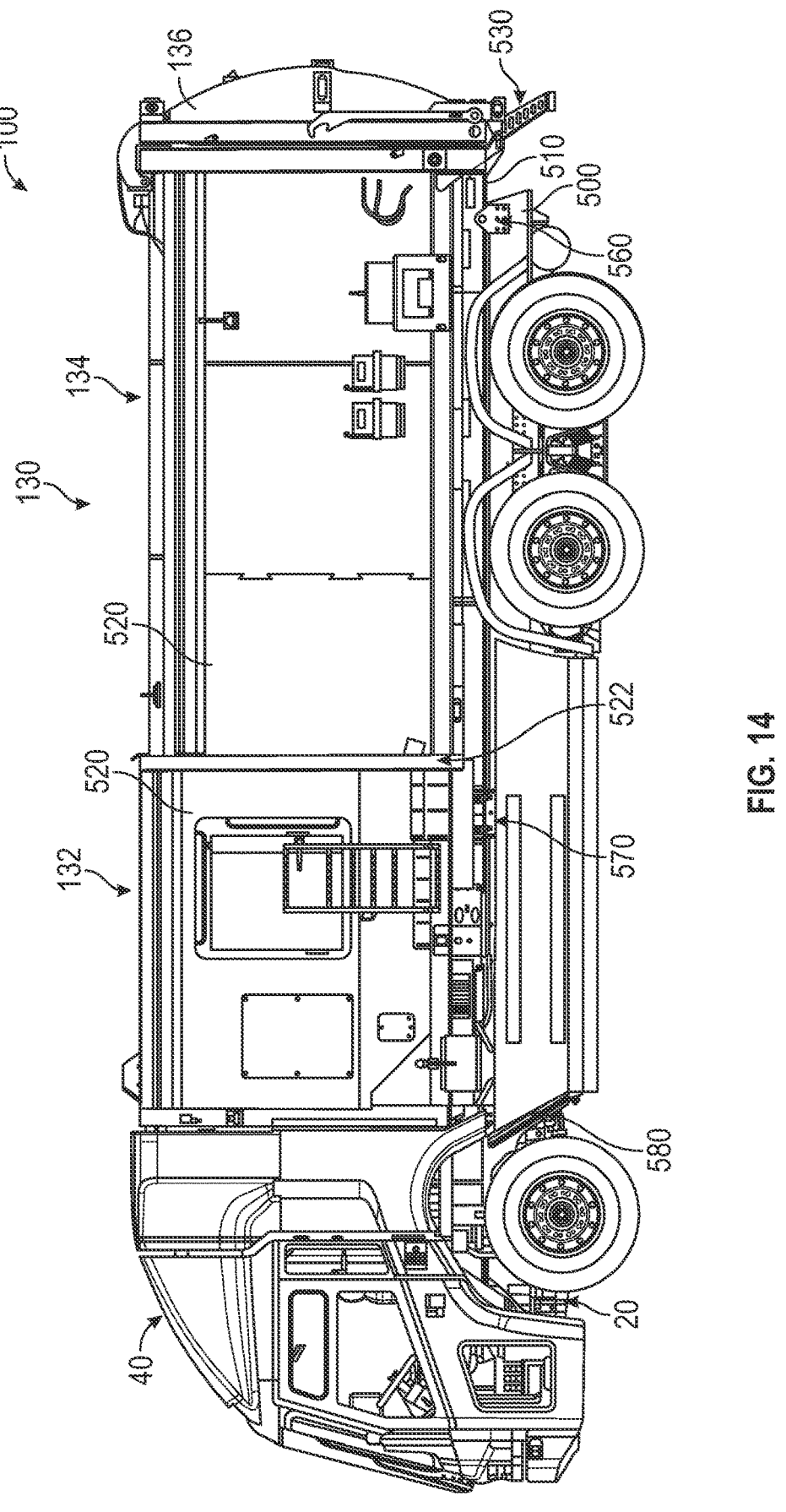
FIG. 14 is a left side view of the side-loading refuse vehicle of FIG. 5.
Figure 15:
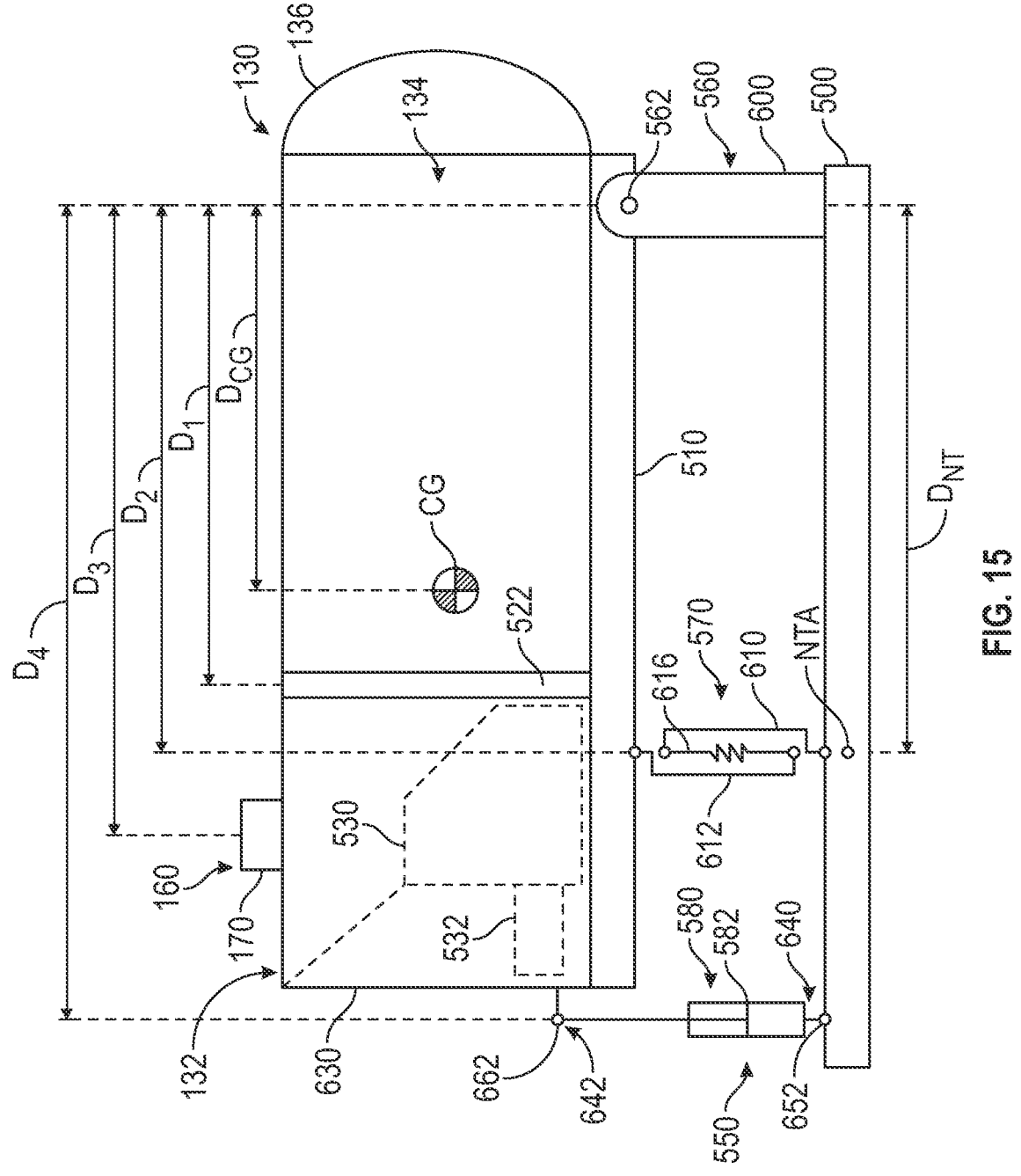
FIG. 15 is a left side schematic view of the side-loading refuse vehicle of FIG. 5.

Referring to FIGS. 14 and 15, the chassis 20 of the refuse vehicle 100 includes a pair of longitudinal frame members, shown as frame rails 500. The frame rails 500 each extend longitudinally along the length of the refuse vehicle 100 and are laterally offset from one another. One of the frame rails 500 (e.g., a left frame rail) includes the front rail portion 30 and the rear rail portion 34 of FIG. 2. The other of the frame rails 500 (e.g., a right frame rail) includes the front rail portion 32 and the rear rail portion 36. In some embodiments, the frame rails 500 each have a C-shaped cross section. In other embodiments, the frame rails 500 have an enclosed rectangular cross section, or another cross-sectional shape.

The refuse compartment 130 (e.g., a body of the refuse vehicle 100) includes a pair of longitudinal frame members, shown as body rails 510, positioned along an underside of the refuse compartment 130. The body rails 510 provide additional structure to the refuse compartment 130 and facilitate mounting the refuse compartment 130 to the chassis 20. Specifically, the body rails 510 each extend longitudinally along the bottom of the refuse compartment 130. The body rails 510 are laterally offset from one another. In some embodiments, the body rails 510 are located at approximately the same lateral positions as the frame rails 500. This lateral alignment of the body rails 510 with the frame rails 500 may facilitate coupling the outboard sides of the body rails 510 to the outboard sides of the frame rails 500. In some embodiments, the body rails 510 each have a C-shaped cross section. In other embodiments, the body rails 510 have an enclosed rectangular cross section, or another cross-sectional shape.

The refuse compartment 130 includes a series of plates or body panels, shown as panels 520, that define the hopper volume 132 and the storage volume 134. The panels 520 may extend around the top, bottom, left, right, and/or front to define the various volumes of the refuse compartment 130. In some embodiments, the rear of the refuse compartment 130 is open, providing an aperture through which refuse can be ejected from the storage volume 134. This opening may be covered by the tailgate 136 during normal operation. The structure provided by the panels 520 may be supplemented by one or more additional frame members of the refuse compartment 130.

The refuse compartment 130 further includes a pair of frame members or posts, shown as midposts 522. The midposts 522 are substantially vertical. The midposts 522 extend along and define a portion of each outboard side of the refuse compartment 130. By way of example, a midpost 522 on the left side of the refuse compartment 130 defines a portion of the left side of the refuse compartment 130. The midposts 522 are both located at the same longitudinal position. Specifically, the midposts 522 are positioned at the transition between the hopper volume 132 and the storage volume 134 (e.g., the position where the hopper volume 132 meets the storage volume 134). Accordingly, the longitudinal position of the midposts 522 represents the longitudinal position of the transition between the hopper volume 132 and the storage volume 134.

Referring to FIG. 15, the refuse vehicle 100 includes a packer 530 within the refuse compartment 130. The packer 530 may normally be positioned within the hopper volume 132 (e.g., in a retracted position) when refuse is added to the hopper volume 132 (e.g., by the lift assembly 160). By way of example, the packer 530 may be positioned entirely forward of the midpost 522 when in the retracted position. The packer 530 may be moved longitudinally through the refuse compartment 130 by an actuator (e.g., a hydraulic cylinder, an electric linear actuator, etc.), shown as pack actuator 532. In some embodiments, the pack actuator 532 is coupled to the refuse compartment 130 (e.g., a front wall of the refuse compartment 130) and the packer 530. The pack actuator 532 may move the packer 530 between the retracted position to an extended position in which the packer 530 extends within the storage volume 134 (e.g., extends behind the midpost 522). The pack actuator 532 may move the packer 530 toward the extended position to (a) move refuse from the hopper volume 132 to the storage volume 134, (b) compact refuse within the storage volume 134, and/or (c) eject refuse from the storage volume 134.

Referring to FIGS. 14 and 15, the refuse compartment 130 is coupled to the chassis 20 by a mounting system 550. The mounting system 550 includes a first mounting assembly, shown as pivot mount 560. The pivot mount 560 pivotally couples the refuse compartment 130 to the chassis 20 such that the refuse compartment 130 is rotatable relative to the chassis 20 about a lateral axis, shown as axis of rotation 562. The mounting system 550 further includes a second mounting assembly, shown as spring mount 570. The spring mount 570 is configured to apply a spring biasing force that resists movement of the refuse compartment 130 away from the chassis 20 (e.g., upward movement of the refuse compartment 130 relative to the chassis). In some embodiments, the spring mount 570 may be selectively decoupled to permit free movement of the refuse compartment 130 relative to the chassis 20 (e.g., to facilitate lifting the refuse compartment 130 to perform maintenance on components beneath the refuse compartment 130 or forward of the refuse compartment 130).

The mounting system 550 further includes a third mounting assembly (e.g., a lift assembly, a dampening assembly, etc.), shown as body lift assembly 580. The body lift assembly 580 includes one or more hydraulic cylinders, linear actuators, or body lift cylinders, shown as lift cylinders 582. The lift cylinders 582 are coupled to and extend between the chassis 20 and the refuse compartment 130. In some embodiments, the lift cylinders 582 can be used to apply an upward force to lift the refuse compartment 130 relative to the chassis 20 (e.g., when performing maintenance). In some embodiments, the lift cylinder 582 provide a damping force that opposes movement of the refuse compartment 130 relative to the chassis 20.

Figure 16:
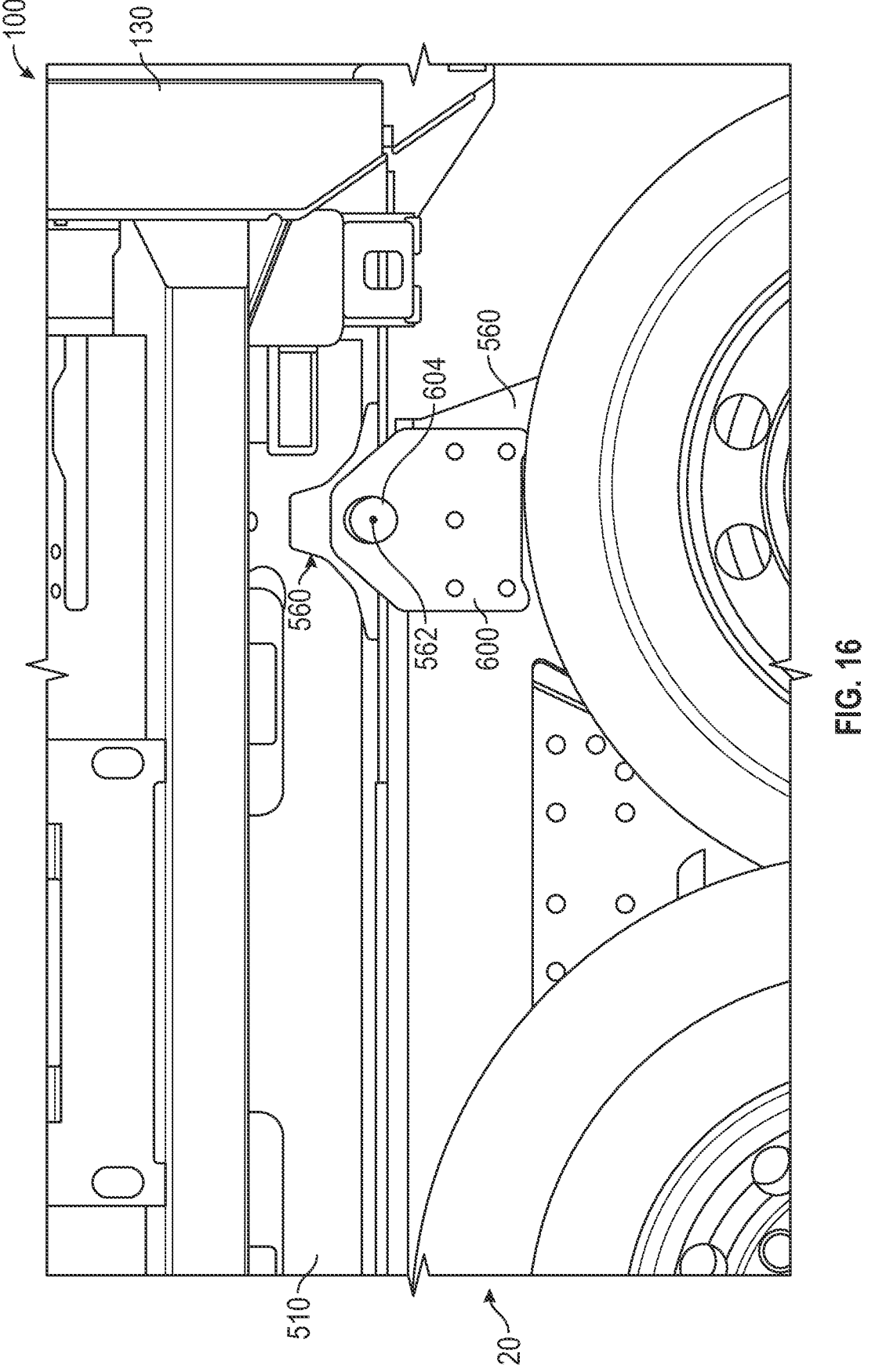
FIG. 16 is a left side view the side-loading refuse vehicle of FIG. 5 including a pivot mount.
Figure 17:
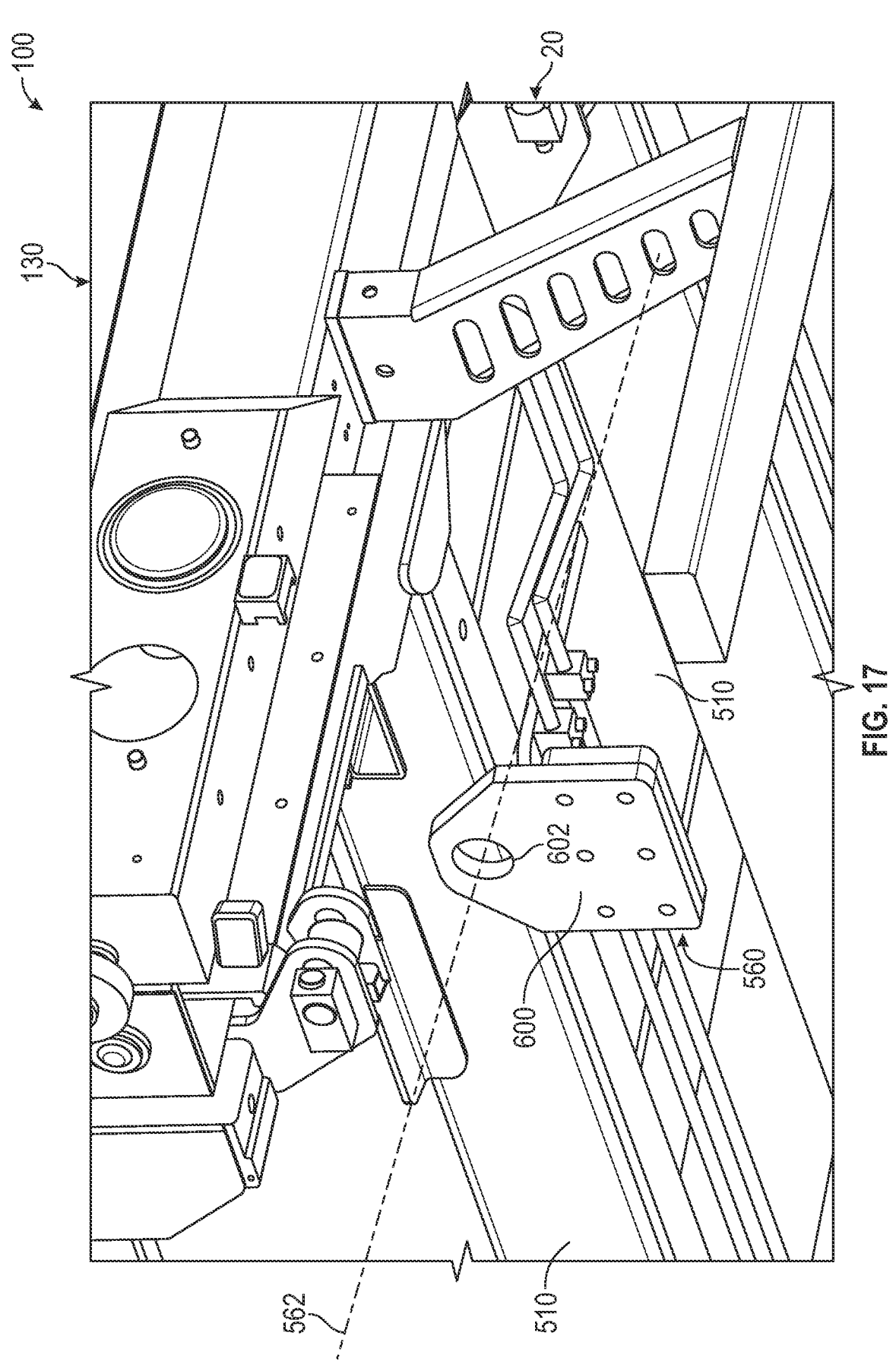
FIG. 17 is a perspective view of the side-loading refuse vehicle of FIG. 5 showing the pivot mount of FIG. 16.

Referring to FIGS. 16 and 17, one of the pivot mounts 560 is shown according to an exemplary embodiment. Although FIGS. 16 and 17 show the pivot mount 560 on the left side of the vehicle, it should be understood that the other pivot mount 560 may be symmetrically arranged about a longitudinal axis. Each pivot mount includes a plate, shown as pivot plate 600, that is coupled to one of the frame rails 500. Specifically, the pivot plate 600 is coupled to an outboard side (e.g., a side facing away from a longitudinal centerline of the vehicle 10) of the frame rail 500. The pivot plate 600 may be a side plate that extends along an outboard side of the frame rail 500 and that is coupled to the frame rail 500 by a series of fasteners that extend through the pivot plate 600 and the frame rail 500. Each pivot plate 600 defines an aperture, shown as pivot aperture 602, that is centered about the axis of rotation 562. Accordingly, the pivot apertures 602 are aligned with one another. Each pivot aperture 602 receives a post or pin, shown as pivot pin 604, that is coupled to a corresponding one of the body rails 510. The pivot pin 604 permits rotation of the body rail 510 relative to the pivot plate 600 about the axis of rotation 562. Accordingly, each pivot mount 560 pivotally couples one of the body rails 510 to one of the frame rails 500.

Figure 18:
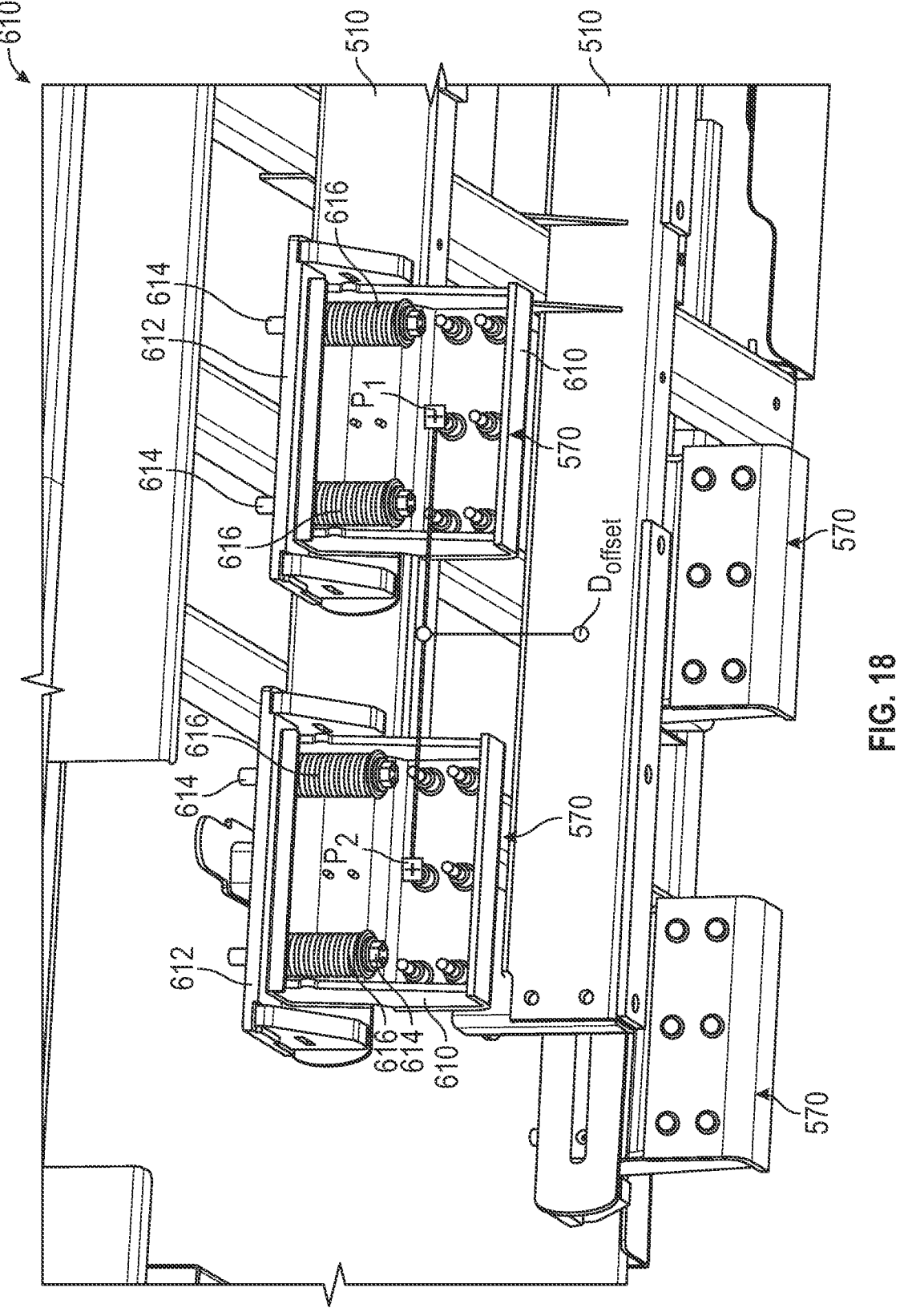
FIG. 18 is a bottom perspective view the side-loading refuse vehicle of FIG. 5 including a pair of spring mounts and further illustrating a position of the spring mounts according to an alternative embodiment in which the side-loading refuse vehicle is configured as a front-loading refuse vehicle.

Referring to FIG. 18, the spring mounts 570 are shown according to an exemplary embodiment. The spring mounts 570 may be symmetrically arranged about a longitudinal axis. FIG. 18 illustrates two pairs of spring mounts 570. One pair of spring mounts 570 is located at a first longitudinal position, shown as position $P_1$. The position $P_1$ may be utilized when the refuse vehicle 100 is configured as a side-loading refuse vehicle. Another pair of spring mounts 570 is located at a second longitudinal position, shown as position $P_2$. The position $P_2$ may be utilized when the refuse vehicle 100 is configured as a front-loading refuse vehicle. Accordingly, although two pairs of the spring mounts 570 are shown in FIG. 18, the refuse vehicle 100 may include only the spring mounts 570 at the position $P_1$ or the spring mounts at the position $P_2$, depending upon whether the refuse vehicle 100 is configured as a side-loading refuse vehicle or a front-loading refuse vehicle. As shown in FIG. 18, the position $P_1$ and the position $P_2$ are offset from one another by a distance $D_{offset}$. In some embodiments, the distance $D_{offset}$ is approximately 21.7 inches.

The spring mounts 570 each include a first bracket or mount, shown as chassis bracket 610, and a second bracket or mount, shown as body bracket 612. The chassis bracket 610 is coupled (e.g., by a series of fasteners) to the outboard surface of one of the frame rails 500. The body bracket 612 is coupled (e.g., by a series of fasteners) to an outboard surface of one of the body rails 510. The body bracket 612 is positioned above the chassis bracket 610. Under a stationary loading, the body bracket 612 may rest atop the chassis bracket 610, such that the chassis bracket 610 imparts an upward force on the refuse compartment 130 through the body bracket 612. Additionally or alternatively, the body rails 510 may rest atop the frame rails 500 at a different location.

Each spring mount further includes a pair of tensile members or fasteners, shown as bolts 614. Each bolt 614 extends substantially vertically through an aperture defined by the chassis bracket 610 and the body bracket 612. Accordingly, each bolt 614 extends above the body bracket 612 and below the chassis bracket 610. A biasing element or biasing member, shown as compression spring 616, is coupled to each of the bolts 614. Specifically, each of the bolts 614 extends through one of the compression springs 616, such that the compression spring 616 is positioned between a bottom end (e.g., a head, a nut, etc.) of the bolt 614. A top end (e.g., a head, a nut, etc.) of the bolt 614 extends along an upper surface of the body bracket 612.

When the refuse compartment 130 moves upward relative to the chassis 20, the body brackets 612 move upward relative to the chassis brackets 610. The upward movement of the body brackets 612 causing the top end of each bolt 614 move upward. The bottom end of each bolt 614 moves upward, but the compression springs 616 are prevented from moving upward by the chassis brackets 610. Accordingly, the compression springs 616 are compressed between the bottom end of each bolt 614 and the chassis bracket 610. The compression spring 616 applies a biasing force that opposes this motion. Accordingly, the compression springs 616 of the spring mounts 570 apply a biasing force that opposes upward motion of the refuse compartment 130 relative to the chassis 20.

Figure 19:
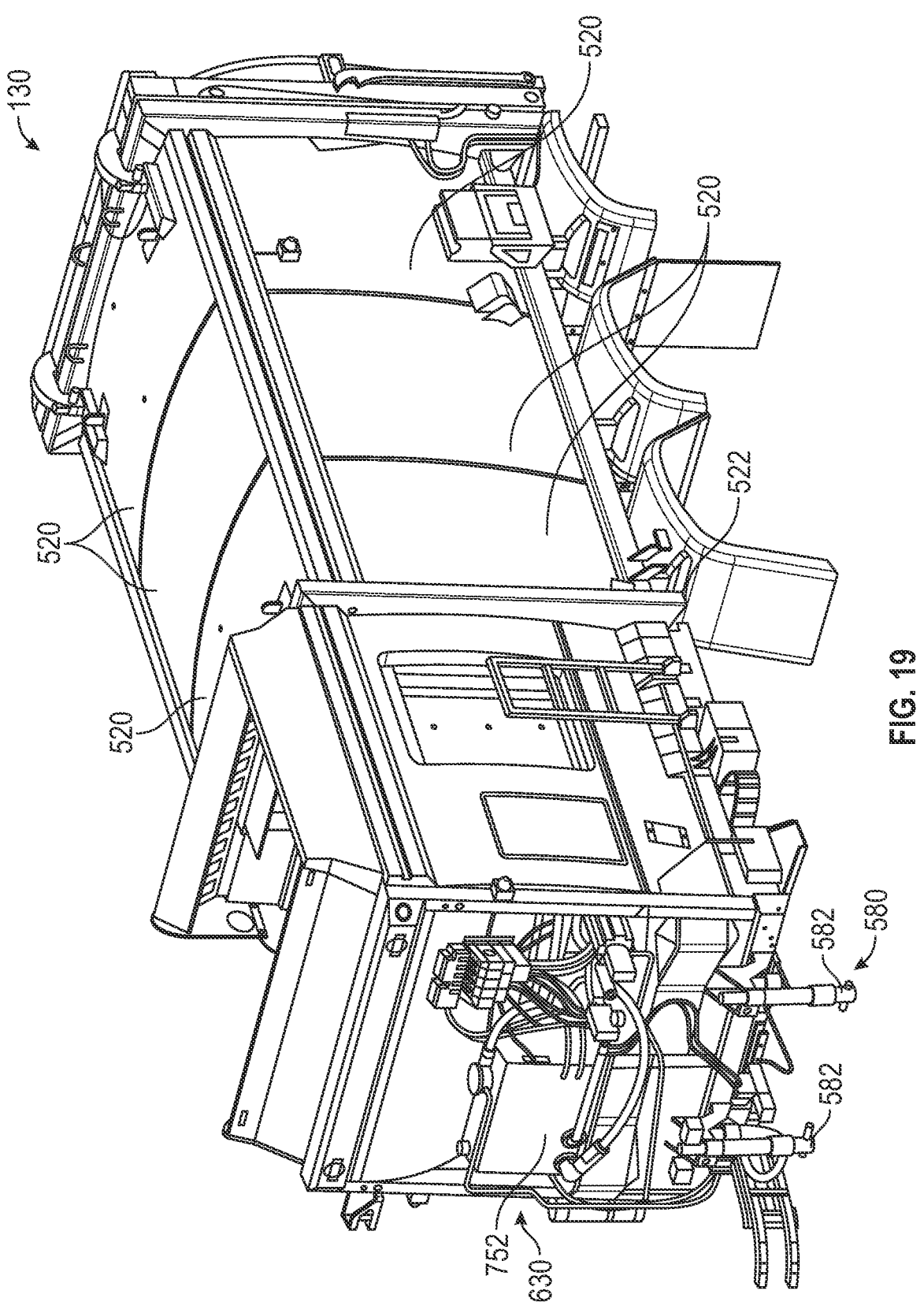
FIGS. 19-21 are perspective views of a body of the side-loading refuse vehicle of FIG. 5.
Figure 20:
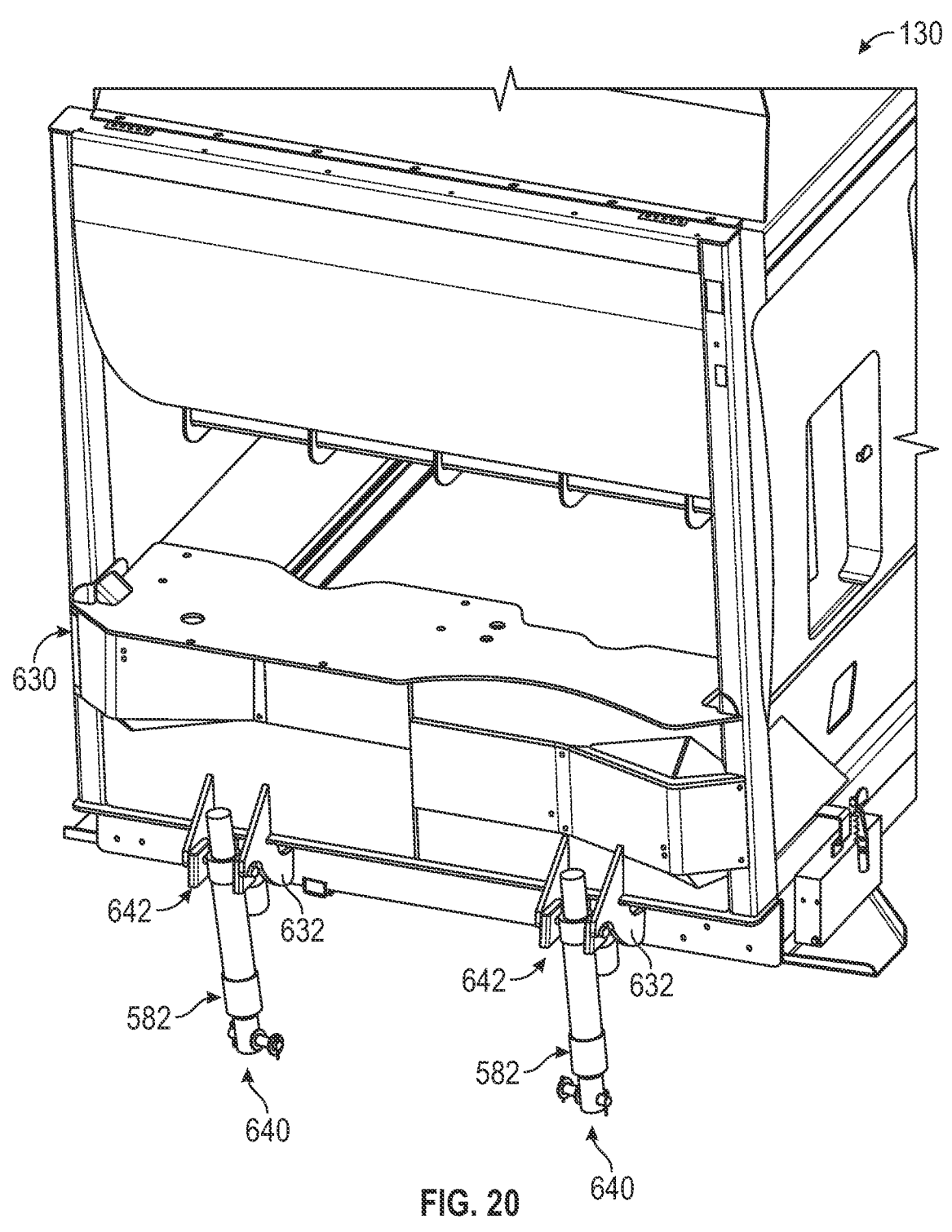
Figure 21:
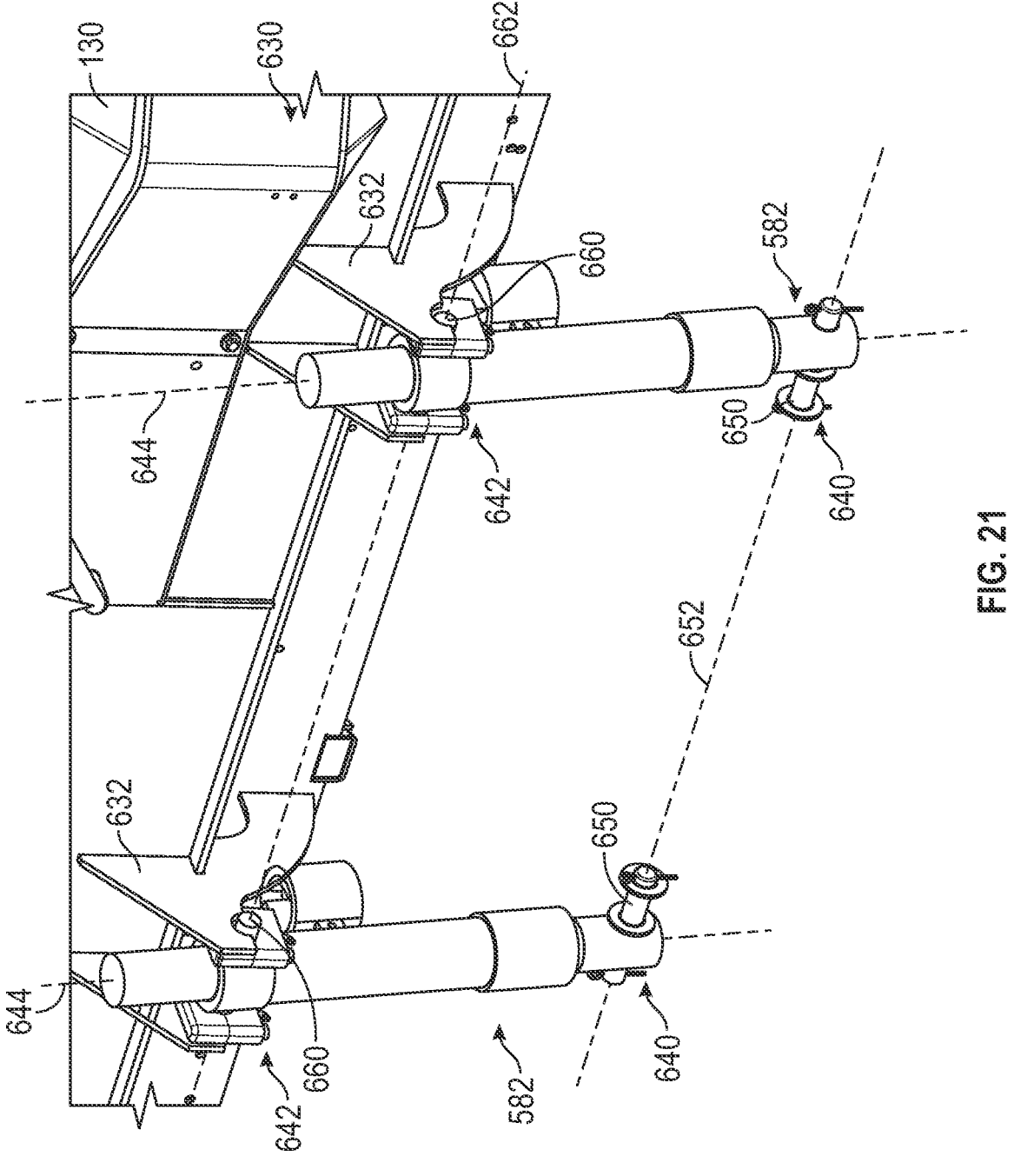

Referring to FIGS. 19-21, the body lift assembly 580 is shown according to an exemplary embodiment. As shown, the body lift assembly 580 is coupled to a front wall 630 of the refuse compartment 130. Specifically, the body lift assembly 580 includes a pair of brackets or mounts, shown as lift brackets 632. The lift brackets 632 are fixedly coupled (e.g., welded) to the front wall 630 and extend forward of the front wall 630. In some embodiments, each lift bracket 632 forms a clevis that pivotally couples one of the lift cylinders 582 to the refuse compartment 130.

Each lift cylinder 582 includes a first end or chassis end, shown as lower end 640, and a second end or body end, shown as upper end 642. The lift cylinder 582 is formed by a rod that is received within a cylinder or body. The upper end 642 is configured to move relative to the lower end 640 along an axis, shown as axis of extension 644. The lower end 640 of each lift cylinder 582 includes a mounting protrusion, shown as pin 650, that extends laterally. The pin 650 is received by an aperture defined by a corresponding bracket coupled to one of the frame rails 500. Accordingly, the pins 650 pivotally couple the lower ends 640 to the chassis 20, such that the lift cylinders 582 rotate relative to the frame rails 500 about a lateral axis of rotation, shown as lower axis 652. The upper end 642 of each lift cylinder 582 includes a mounting protrusion, shown as pin 660, that extends laterally the lift cylinder 582. The pin 660 is received by an aperture defined by the corresponding lift bracket 632. As shown, each lift bracket 632 extends on both sides of the corresponding lift cylinder 582 to receive an end of the pin 660. Accordingly, the pins 660 pivotally couple the upper ends 642 to the chassis 20, such that the lift cylinders 582 rotate relative to the refuse compartment 130 about a lateral axis of rotation, shown as upper axis 662. As shown in FIG. 21, the upper axis 662 and the lower axis 652 are both positioned longitudinally forward of the front wall 630 of the refuse compartment 130.

Figure 22:
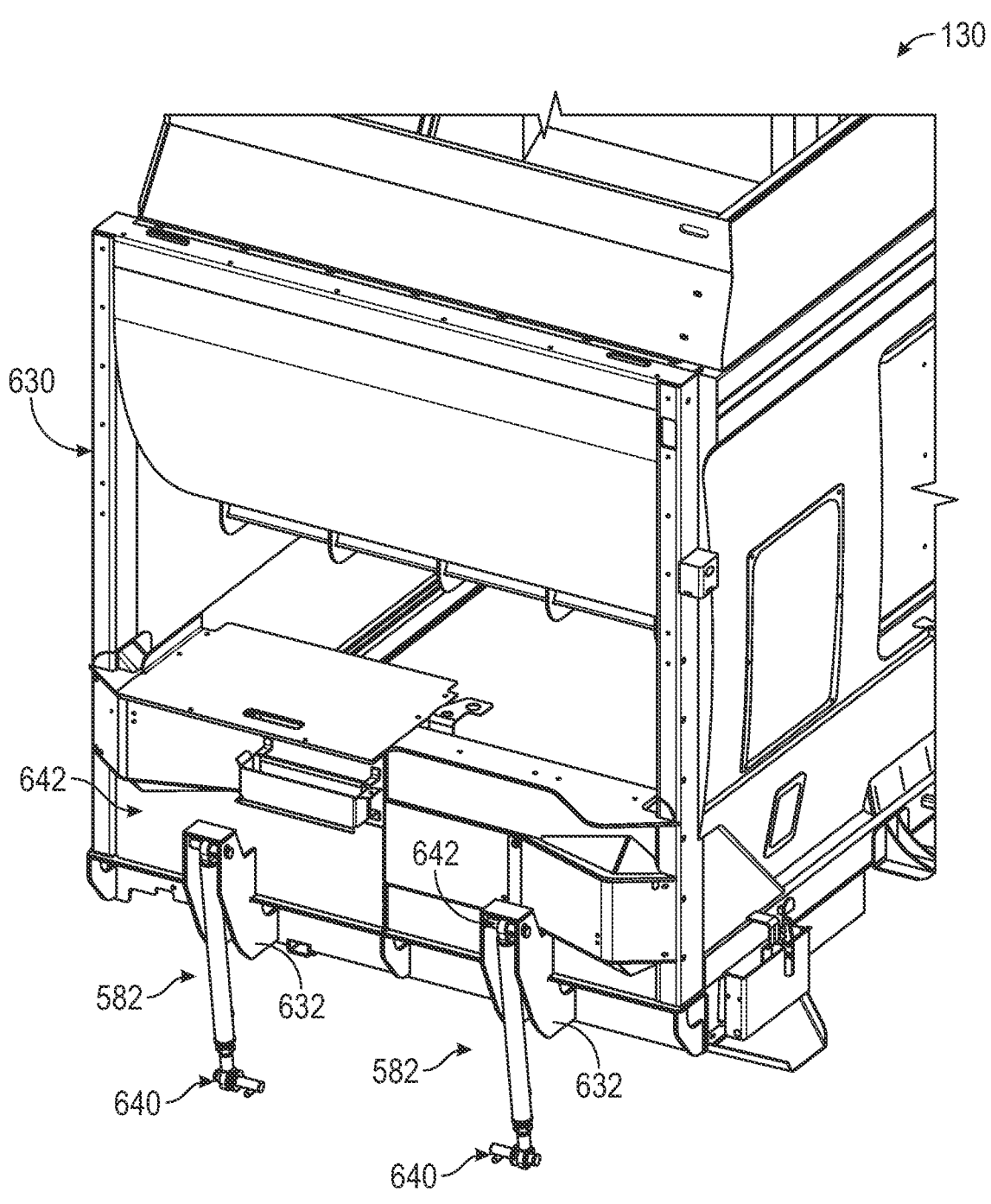
FIGS. 22 and 23 are perspective views of a body of the side-loading refuse vehicle of FIG. 5 including alternative body lift cylinders.
Figure 23:
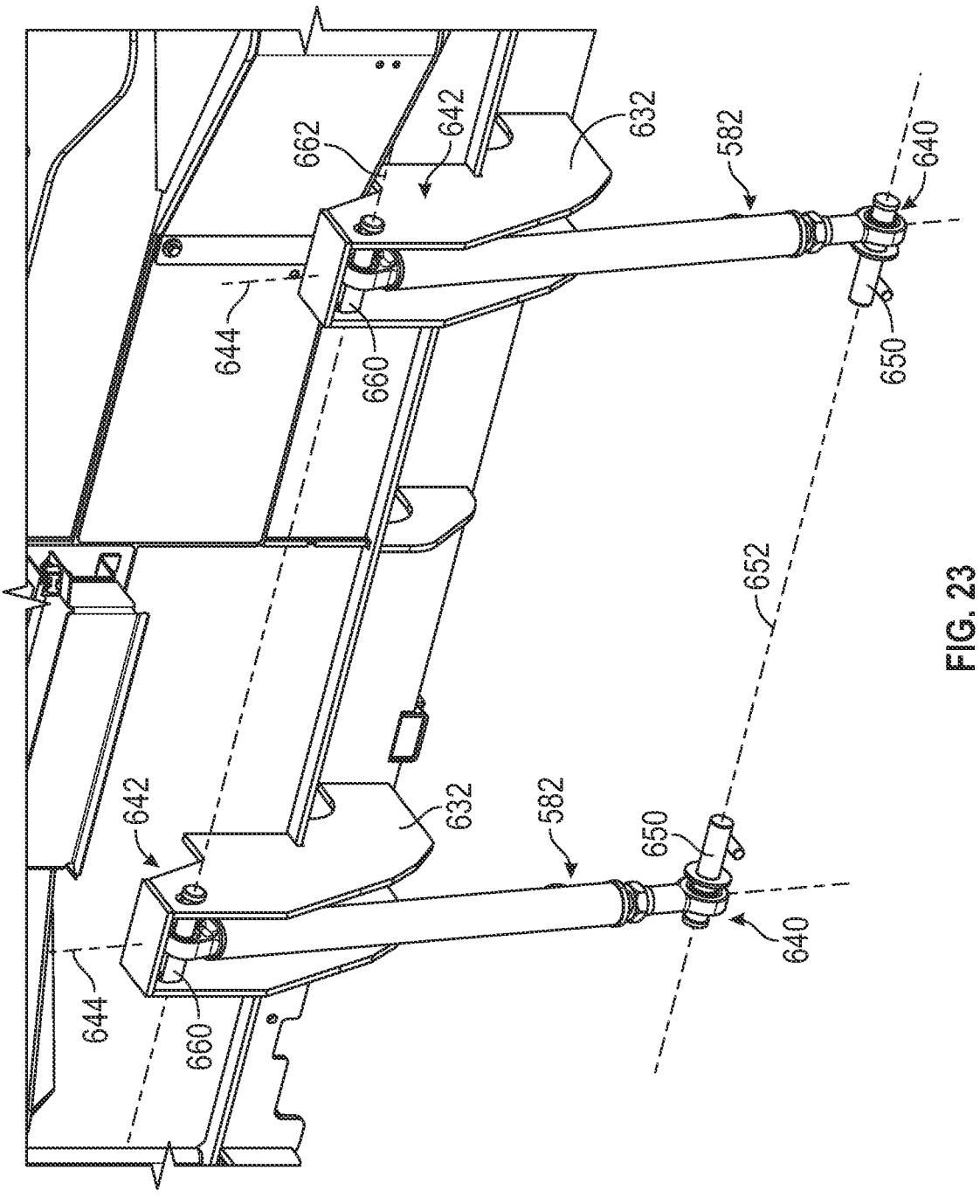

In the embodiment of FIGS. 20 and 21, the lift cylinders 582 are configured as trunnion mount cylinders. In this this embodiment, the pins 660 are fixedly coupled to the lift cylinders 582. FIGS. 22 and 23 illustrate an embodiment of the refuse vehicle 100 with an alternative configuration of the lift cylinders 582 and may be substantially similar to the embodiment of FIGS. 20 and 21 except as otherwise specified. In this embodiment, the lift cylinders 582 are configured as end mount cylinders such that the pins 660 are coupled to the end of the lift cylinders 582. In some embodiments, the pins 650 and 660 are coupled to the lift cylinder 582 through spherical bearings (e.g., to facilitate alignment of the pins 660 and the pins 650)

In operation, the lift cylinders 582 extend (e.g., the upper end 642 moves away from the lower end 640) as the refuse compartment 130 moves upward relative to the chassis 20. Similarly, the lift cylinders 582 retract (e.g., the upper end 642 moves toward the lower end 640) as the refuse compartment 130 moves downward relative to the chassis 20. Accordingly, the lift cylinders 582 can control the relative position of the refuse compartment 130 and the chassis 20. By way of example, if hydraulic fluid were added to a first chamber within each lift cylinder 582 (e.g., the cap end volume 720), the lift cylinders 582 would extend and raise the refuse compartment 130. If hydraulic fluid were added to a second chamber within each lift cylinder 582 (e.g., the rod end volume 722), the lift cylinders 582 would retract and lower the refuse compartment 130. The amount of hydraulic fluid in each lift cylinder 582 may be varied by an operator to raise or lower the refuse compartment 130.

Similarly, extension or retraction of the lift cylinders 582 causes fluid to flow into or out of the ends of the lift cylinders 582. By routing this fluid through a flow restrictor, such as an orifice, this flow can be opposed, as described herein. Accordingly, the lift cylinders 582 can be made to provide a damping force that resists motion of the refuse compartment 130 relative to the chassis 20.

Referring to FIGS. 14 and 15, the relative longitudinal positions of the pivot mounts 560, the spring mounts 570, and the body lift assembly 580 are shown, according to an exemplary embodiment. The pivot mounts 560 are positioned near the rear end of the chassis 20 and the refuse compartment 130. As shown, the refuse compartment 130 rotates relative to the chassis 20 about the axis of rotation 562. A center of gravity CG of the refuse compartment 130 is positioned forward of the pivot mounts 560, such that the center of gravity CG is offset a distance $D_{CG}$ from the axis of rotation 562.

The midposts 522 are positioned forward of the pivot mounts 560, such that the midposts 522 are positioned a distance $D_1$ from the axis of rotation 562. As shown, the distance $D_1$ is greater than the distance $D_{CG}$ such that the center of gravity CG is positioned rearward of the midposts 522. In other embodiments, the center of gravity CG is positioned at the midposts 522 or forward of the midposts 522.

The spring mounts 570 are positioned forward of the pivot mounts 560, such that the spring mounts 570 are positioned a distance $D_2$ from the axis of rotation 562 (e.g., the force imparted by the spring mounts 570 is centered about an axis that is offset the distance $D_2$ from the axis of rotation 562). As shown, the distance $D_2$ is greater than the distance $D_1$ such that the spring mounts 570 are positioned forward of the midposts 522. In other embodiments, the spring mounts 570 are positioned at the midposts 522 or rearward of the midposts 522.

The lift assembly 160 is positioned forward of the pivot mounts 560, such that the center of the lift assembly 160 (e.g., the center of the track 170) is positioned a distance $D_3$ from the axis of rotation 562. As shown, the distance $D_3$ is greater than the distance $D_2$ such that the lift assembly 160 is positioned forward of the spring mounts 570. In other embodiments, the lift assembly 160 has the same longitudinal position as the spring mounts 570 or is positioned rearward of the spring mounts 570.

The body lift assembly 580 is positioned forward of the pivot mounts 560, such that the body lift assembly 580 is positioned a distance $D_4$ from the axis of rotation 562 (e.g., the force imparted by the body lift assembly 580 is centered about an axis that is offset the distance $D_4$ from the axis of rotation 562). As shown, the body lift assembly 580 is positioned forward of the front wall 630, such that the distance $D_4$ is greater than a distance between the axis of rotation 562 and the front wall 630. As shown, the distance $D_4$ is greater than the distance $D_3$ such that the body lift assembly 580 is positioned forward of the spring mounts 570 and the lift assembly 160. In other embodiments, the body lift assembly 580 is positioned at the front wall 630, rearward of the front wall 630, at the lift assembly 160, rearward of the lift assembly 160, at the spring mounts 570, or rearward of the spring mounts 570.

The mounting system 550 permits relative movement between the refuse compartment 130 and the chassis 20. Generally, due to the size and shape of the refuse compartment 130, the refuse compartment 130 may be stiffer (e.g., more resistant to bending deformation about a lateral axis, twisting deformation about a longitudinal axis, etc.) than the chassis 20. By way of example, the large, enclosed shape of the refuse compartment 130 may be more resistant to deformation than the open shapes of the C-shaped frame rails 500. Accordingly, by permitting the chassis 20 to move relative to the refuse compartment 130, the chassis 20 is permitted to flex in response to certain loadings.

This flexibility may be advantageous in certain situations. By way of example, when traversing a raised portion (e.g., a bump) or recessed portion (e.g., a depression, a pot hole, etc.) of a road, the portion of the road supporting one of the wheel and tire assemblies 54 may be located at a different height than the portion of the road supporting an adjacent wheel and tire assembly 54. If the chassis 20 were completely rigid, this variation in height of the road could cause one corner of the chassis 20 to be lifted, such that the weight supported by the corresponding wheel and tire assembly 54 is reduced. This could increase the weight supported by the other wheel and tire assemblies 54 and introduce additional stresses into the chassis 20. By permitting the chassis 20 to flex in such situations, these additional stresses can be reduced or eliminated.

However, the flexibility of the chassis 20 can be a disadvantage in some situations. If a portion of the chassis 20 (e.g., a front end portion) moves downward relative to the refuse compartment 130 (e.g., when the front wheel and tire assemblies 54 traverse a bump or depression in the road), the distance between the chassis 20 and the refuse compartment 130 increases. After this initial separation, the refuse compartment 130 is biased to return to a position in which the refuse compartment 130 is fully supported by the chassis 20, both by the force of gravity acting on the center of gravity CG and by the forces imparted by the spring mounts 570. Depending upon the speed at which the refuse compartment 130 returns to contact with the chassis 20, the chassis 20 and the refuse compartment 130 may experience large impact forces. The impact when the refuse compartment 130 come back into contact with the chassis 20 may be referred to as "body slap."

The mounting system 550 is configured to mitigate the forces (and resultant stresses) experienced by the chassis 20 and the refuse compartment 130 due to variations in the height of a road surface. The mounting system 550 accomplishes this with a specific longitudinal placement of spring mounts 570. Specifically, the spring mounts 570 are positioned (a) forward of the axis of rotation 562 and the midpost 522, (b) rearward of the lift assembly 160, the front wall 630, and the body lift assembly 580, and (c) within a threshold distance of a neutral twist axis NTA of the chassis 20.

The longitudinal placement of the spring mounts 570 relative to the axis of rotation 562 (e.g., the distance $D_2$) may vary the forces experienced during various events. A shorter distance $D_3$ decreases the moment effect of the collective biasing force of the spring mounts 570. This permits greater flexibility of movement of the chassis 20, reducing the forces experienced by the chassis 20 when the chassis is flexed. However, this also reduces the ability of the spring mounts 570 to limit upward movement of the refuse compartment 130, potentially increasing the severity of body slap events. A greater distance $D_3$ increases the moment effect of the collective biasing force of the spring mounts 570. This increases the ability of the spring mounts 570 to limit upward movement of the refuse compartment 130, reducing the severity of body slap events. However, this may limit the flexibility of the movement of the chassis 20, increasing the forces experienced by the chassis 20 when the chassis 20 is flexed.

The longitudinal position of the spring mounts 570 shown in FIGS. 14 and 15 represents the ideal longitudinal position of the spring mounts 570 relative to other components of the refuse vehicle 100. As shown, the spring mounts 570 are positioned (a) forward of the axis of rotation 562 and the midpost 522 and (b) rearward of the lift assembly 160, the front wall 630, and the body lift assembly 580. This longitudinal position has been shown to reduce the severity of body slap event while also permitting compliance of the chassis 20. In one experiment, subjecting the refuse vehicle 100 to a given loading resulting in twisting of the chassis 20 with the spring mounts 570 at the position of FIGS. 14 and 15 resulted in a biasing force of 8,000 lbs at the spring mounts 570. Subjecting the refuse vehicle 100 to the same loading with the spring mounts 570 repositioned to the longitudinal position of the front wall 630 resulted in a biasing force of 25,000 lbs at the spring mounts 570. Accordingly, the position of the spring mounts 570 relative to the other components of the refuse vehicle 100 facilitates minimizing the forces (and resultant stresses) experienced by the chassis 20 and the refuse compartment 130.

A neutral twist axis NTA (e.g., a neutral pivot axis, a twisting equilibrium position, etc.) is defined as a longitudinal position at which the laterally outboard positions of the chassis (e.g., the left and right sides) experience equal vertical displacement when the chassis is subjected to a twisting load about a longitudinal axis. By way of example, the neutral twist axis NTA may represent the longitudinal position at which the vertical displacements of the frame rails 500 are equal (e.g., the longitudinal position where the frame rails 500 reach the same vertical position) when the chassis 20 is subjected to a twisting load about a longitudinal axis LA. FIGS. 5 and 7 illustrate an example of such a longitudinal axis LA. Specifically, in FIGS. 5 and 7, the longitudinal axis LA represents a longitudinal centerline of the refuse vehicle 100 (e.g., a longitudinal axis that is laterally centered on the refuse vehicle 100).

Figure 24:
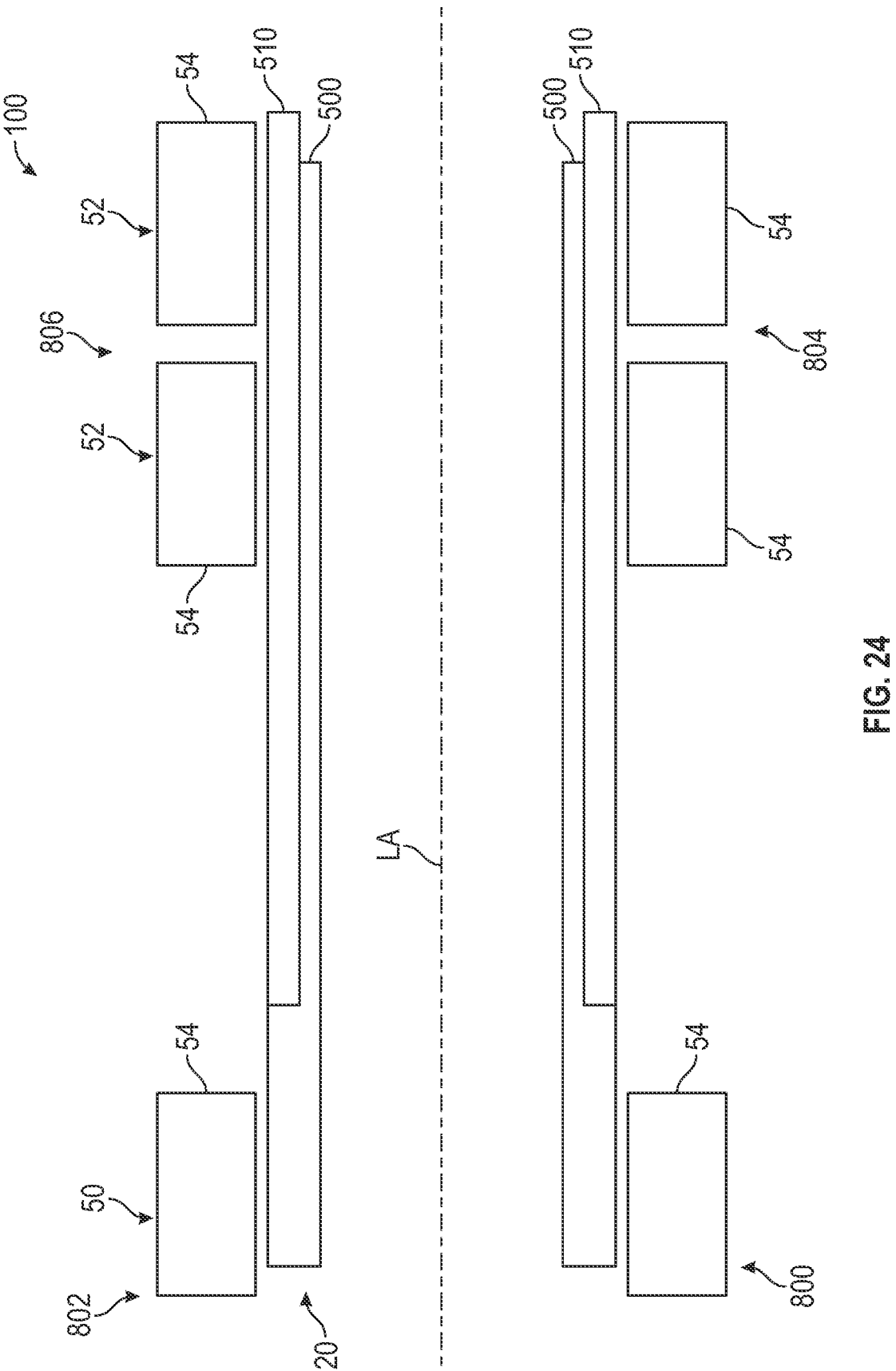
FIG. 24 is a top view of a chassis of the side-loading refuse vehicle of FIG. 5.
Figures 25, 26:
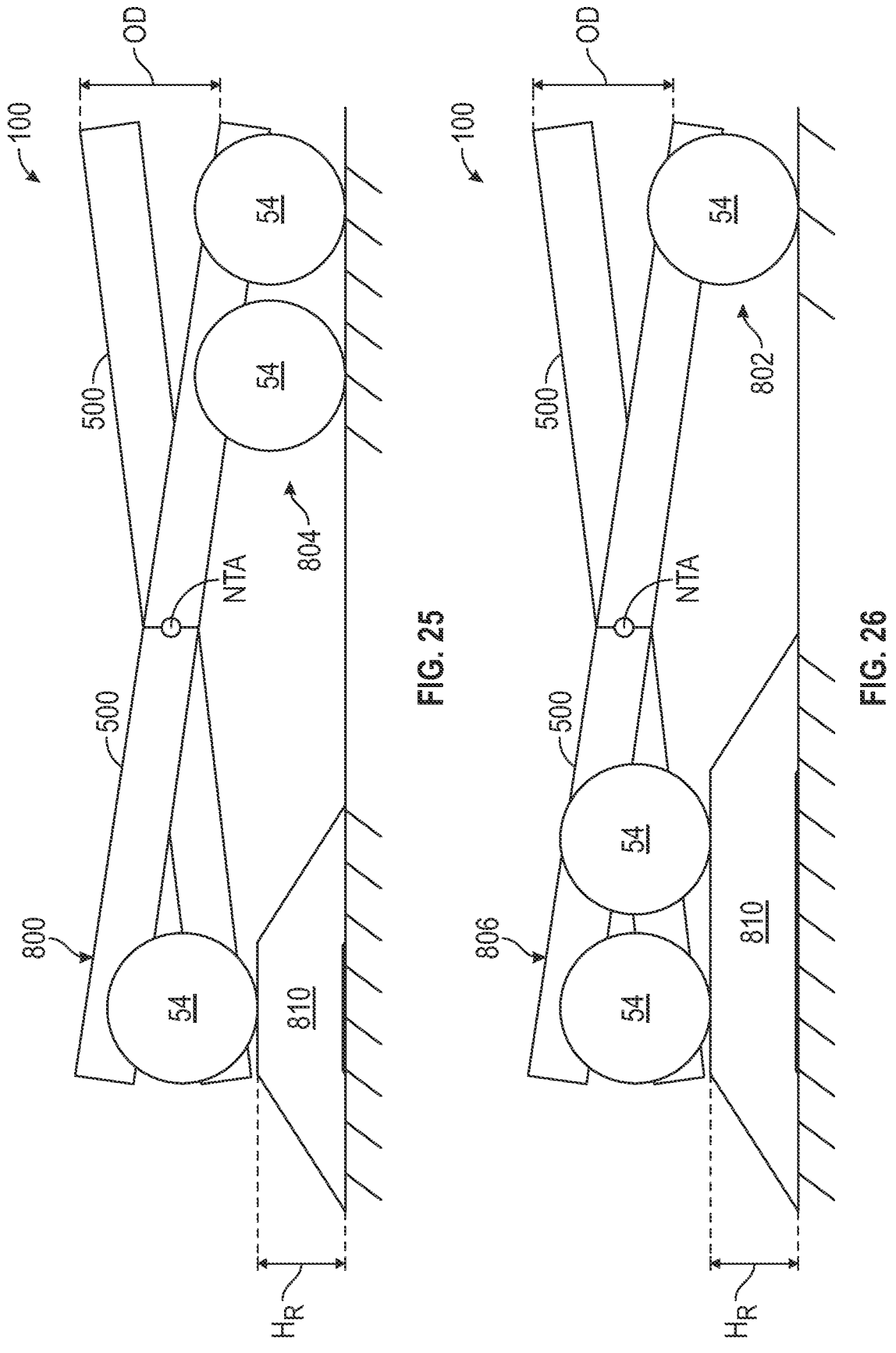
FIG. 25 is a left view of the chassis of FIG. 24 in a configuration for determining a location of a neutral twist axis.
FIG. 26 is a right view of the chassis of FIG. 24 in the configuration for determining the location of the neutral twist axis.

FIGS. 24-26 illustrate a possible method for measuring the location of the neutral twist axis NTA for the chassis 20. This method may be performed when the refuse compartment 130 is empty (e.g., after refuse has been expelled from the refuse compartment 130). As shown in FIG. 24, the refuse vehicle 100 includes a series of support portions or vehicle corner assemblies, shown as a front left corner 800, a front right corner 802, a rear left corner 804, and a rear right corner 806. Each corner includes a portion of the vehicle (e.g., one or more wheel and tire assemblies 54) that contacts a support surface beneath the refuse vehicle 100. As shown, the front left corner 800 and the rear right corner 806 are positioned opposite one another (i.e., are opposite corners). Similarly, the front right corner 802 and the rear left corner 804 are positioned opposite one another (i.e., are opposite corners).

To locate the neutral twist axis NTA, the refuse vehicle 100 is placed above a flat surface, shown as ground G. Two of the opposite corners are elevated above the ground G. As shown, the front left corner 800 and the rear right corner 806 are elevated. Alternatively, a similar process may be followed by elevating the front right corner 802 and the rear left corner 804. A corner may be elevated by driving the corresponding wheel and tire assembly 54 or wheel and tire assemblies 54 onto an elevated surface, shown as ramp 810. As shown, each ramp 810 has a top surface positioned at a height $H_R$ such that the corresponding corner is elevated by the height $H_R$. In some embodiments, both ramps 810 have the same height $H_R$. In some embodiments, the height $H_R$ is approximately 10 inches.

With two opposing corners elevated, the chassis 20 flexes such that the two non-elevated corners (e.g., the front right corner 802 and the rear left corner 804 shown in FIGS. 25 and 26) sag downward due to the force of gravity. In some embodiments, both of the non-elevated corners contact the ground G in this configuration. In other embodiments, both of the non-elevated corners are offset the same distance above the ground G.

The frame rails 500 each represent the laterally outboard portions of the chassis 20. Due to the twisting of the chassis 20, one of the frame rails 500 is inclined in a forward direction (e.g., as shown in FIG. 25), whereas the other of the frame rails 500 is declined in the forward direction (e.g., as shown in FIG. 26). Accordingly, at a longitudinal end of the chassis 20 (e.g., a front end or a rear end), the frame rails 500 are vertically offset from one another by an offset distance OD. The offset distance OD may be measured from any common reference point along the frame rail 500 (e.g., the top surface, the bottom surface, a point offset 1 inch from the top surface, etc.). The offset distance OD may also be determined as the difference between (a) the vertical distance from the first reference point to the ground G and (b) the vertical distance from the second reference point to the ground G. As the frame rails 500 extend longitudinally toward the middle of the chassis 20, the offset distance OD decreases. The longitudinal position where the offset distance OD becomes zero is considered the longitudinal position of the neutral twist axis NTA.

Referring again to FIGS. 14 and 15, the neutral twist axis NTA is positioned a distance $D_{NT}$ forward from the axis of rotation 562. The spring mounts 570 are positioned within a threshold longitudinal distance of the neutral twist axis NTA. In other words, the relative positions of the spring mounts 570 and the neutral twist axis NTA can be described as:

$$D_{NTA}-\text{threshold} \leq D_2 \leq D_{NT}+\text{threshold} \qquad (1)$$

In some embodiments, the threshold distance is 3 feet, such that the spring mounts 570 are positioned within 3 feet of the neutral twist axis NTA (i.e., the spring mounts 570 are less than or equal to 3 feet from the neutral twist axis NTA). In some such embodiments, the threshold distance is 2 feet, such that the spring mounts 570 are positioned within 2 feet of the neutral twist axis NTA. In some such embodiments, the threshold distance is 1 foot, such that the spring mounts 570 are positioned within one foot of the neutral twist axis NTA. By placing the spring mounts 570 in close proximity to the neutral twist axis NTA, the displacement of the spring mounts 570 when the chassis 20 twists is minimized. Minimizing the displacement of the spring mounts 570 in this way minimizes the forces imparted by the spring mounts 570, which in turn minimizes the stresses experienced by the chassis 20 and the refuse compartment 130.

Body Lift Cylinder Configuration

Figure 27:
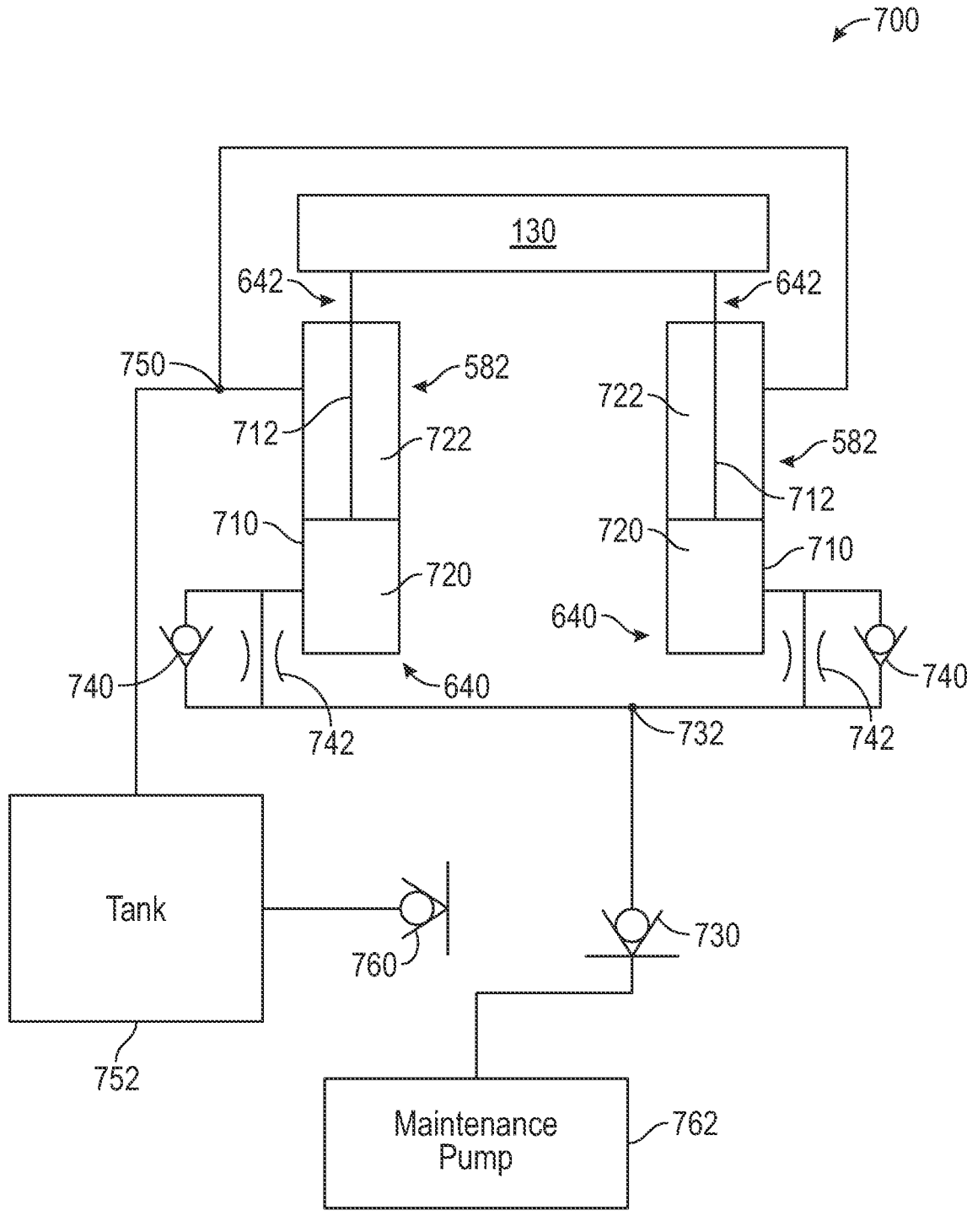
FIG. 27 is a schematic of a hydraulic system for a vehicle in a maintenance configuration, according to an exemplary embodiment.
Figure 28:
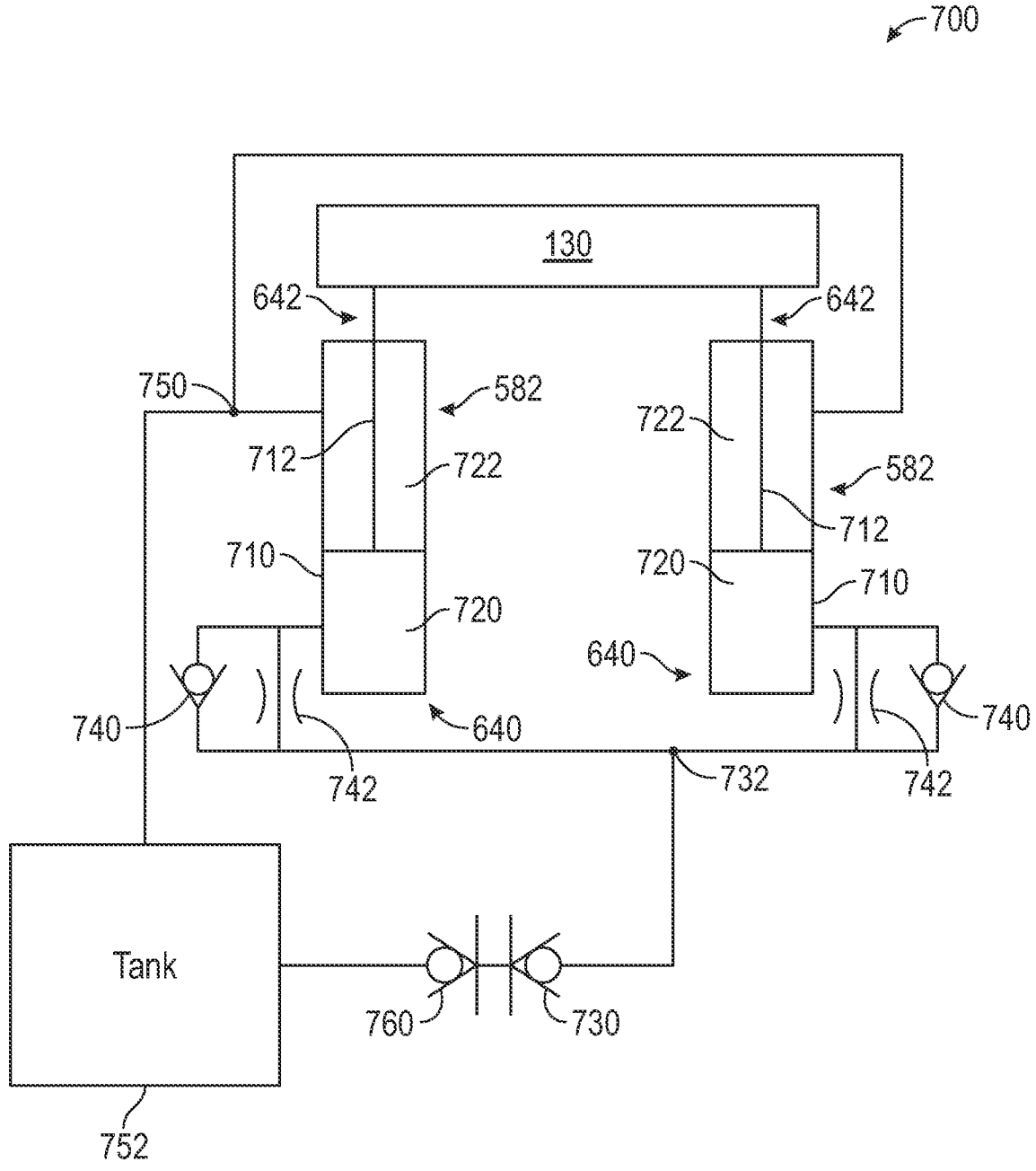
FIG. 28 is a schematic of the hydraulic system of FIG. 27 in a damping configuration.

Referring to FIGS. 27 and 28, a hydraulic system or hydraulic circuit is shown as hydraulic system 700, according to an exemplary embodiment. The hydraulic system 700 is configured to control the body lift cylinders 582. In some embodiments, the hydraulic system 700 is selectively reconfigurable between a maintenance configuration or body lift configuration, shown in FIG. 27, and a use configuration or damping configuration, shown in FIG. 28. The maintenance configuration may be utilized to lift the refuse compartment 130 relative to the chassis 20 (e.g., to facilitate accessing components beneath or forward of the refuse compartment 130 for cleaning or maintenance). In the damping configuration, the lift cylinders 582 may provide a damping force to limit rapid movements of the refuse compartment 130 relative to the chassis 20.

Referring to FIGS. 27 and 28, the hydraulic system 700 includes two of the lift cylinders 582. Each body lift cylinder 582 includes a body or cylinder, shown as body 710, and a rod 712. As shown, the body 710 defines the lower end 640, and the rod 712 defines the upper end 642. In other embodiments, the lift cylinders 582 are inverted, and the body 710 defines the upper end 642 while the rod 712 defines the lower end 640. The rod 712 is received within the body 710 and configured to translate relative to the body 710. The body 710 and the rod 712 define a pair of chambers or volumes, shown as cap end volume 720 and rod end volume 722. When the body lift cylinder 582 extends, the cap end volume 720 increases and the rod end volume 722 decreases. When the body lift cylinder 582 retracts, the cap end volume 720 decreases and the rod end volume 722 increases.

An inlet fitting or outlet fitting, shown as fitting 730, defines an inlet/outlet to the hydraulic system 700. As shown, the fitting 730 is a quick disconnect fitting that is configured to prevent flow out of the system through the fitting 730 when the fitting 730 is not connected to another conduit. The fitting 730 is fluidly coupled to a node 732 of the hydraulic system 700. The node 732 is fluidly coupled to both of the cap end volumes 720 of both of the body lift cylinders 582. Specifically, the node 732 is fluidly coupled to each cap end volume 720 through a flow control device or valve, shown as check valve 740, and a flow restriction, shown as orifice 742. In some embodiments, the orifices 742 are approximately 0.05" diameter. The check valve 740 and the orifice 742 are connected in parallel with one another. The orifice 742 permits restricted bidirectional flow between the node 732 and the cap end volume 720 through the orifice 742. The check valve 740 permits unrestricted flow from the node 732 to the cap end volume 720 through the check valve 740. The check valve 740 prevents flow from the cap end volume 720 to the node 732 through the check valve 740. As the check valves 740 and the orifices 742 fluidly couple both cap end volumes 720 to the node 732, the check valves 740 and the orifices 742 fluidly couple the cap end volumes 720 to one another.

The rod end volumes 722 are both coupled to a node 750 of the hydraulic system 700. Accordingly, the rod end volumes 722 are fluidly coupled to one another. The node 750 is further fluidly coupled to a low pressure container, reservoir, or tank, shown as tank 752. Accordingly, the rod end volumes 722 are fluidly coupled to the tank 752. The tank 752 acts as a reservoir to receive fluid from and supply fluid to the body lift cylinders 582. In some embodiments, the tank 752 holds hydraulic fluid at atmospheric pressure. By way of example, the tank 752 may contain fluid exposed to the surrounding atmosphere. In other embodiments, the tank 752 is replaced with an accumulator or other type of container that holds hydraulic fluid at greater than atmospheric pressure. As shown in FIG. 19, the tank 752 may be coupled to the front wall 630 of the refuse compartment 130, such that the tank 752 is positioned onboard the refuse vehicle 100.

An inlet fitting or outlet fitting, shown as fitting 760, defines an inlet/outlet to the hydraulic system 700. As shown, the fitting 760 is a quick disconnect fitting that is configured to prevent flow out of the system through the fitting 760 when the fitting 760 is not connected to another conduit. The fitting 760 is fluidly coupled to the tank 752.

A pressurized fluid source, shown as maintenance pump 762, is configured to selectively supply a flow of pressurized hydraulic fluid to hydraulic system 700. The maintenance pump 762 may be an offboard pump that is only brought into connection with the hydraulic system 700 when performing maintenance. Accordingly, the refuse vehicle 100 may be reconfigured from the damping configuration to the maintenance configuration without an onboard pump. Alternatively, the maintenance pump 762 may be positioned onboard the refuse vehicle 100. In some embodiments, the maintenance pump 762 is a motor-driven pump. In other embodiments, the maintenance pump 762 is manually driven by an operator.

Figure 29:
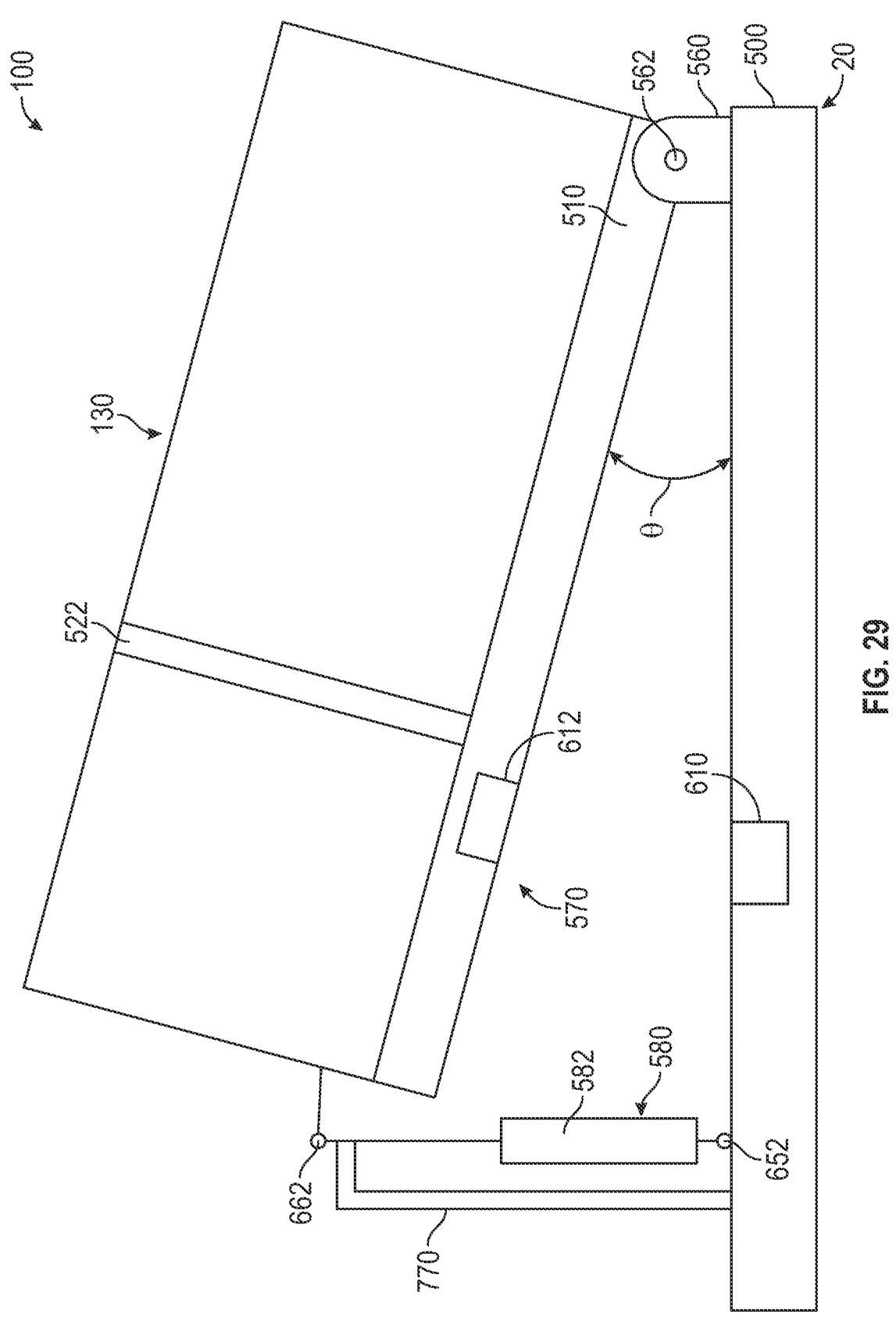
FIG. 29 is a left side schematic view of the side-loading refuse vehicle of FIG. 5 with the hydraulic system of FIG. 27 in the maintenance configuration.

Referring to FIGS. 27 and 29, the refuse vehicle 100 is configured in a maintenance configuration. To configure the refuse vehicle 100 in the maintenance configuration, the fitting 730 is fluidly coupled to the maintenance pump 762. The fitting 760 is disconnected, sealing the fitting 760 to prevent fluid flow therethrough. The spring mounts 570 are disconnected (e.g., by removing the bolts 614), freeing the refuse compartment 130 to move upward without opposition from the spring mounts 570. The maintenance pump 762 supplies pressurized fluid through the fitting 730, the node 732, the check valves 740, and the orifices 742 to the cap end volumes 720. This fluid causes the body lift cylinders 582 to extend, lifting the refuse compartment 130. This process is continued until the refuse compartment 130 reaches an elevated position, shown in FIG. 27. When in the elevated position, the refuse compartment 130 is oriented at a maintenance angle θ relative to the frame rails 500 (e.g., relative to a horizontal plane when the refuse vehicle 100 is level). Once in the elevated position, a prop, stop, or maintenance frame, shown as maintenance prop 770, is coupled to the chassis 20 and the refuse compartment 130. The maintenance prop 770 holds the refuse compartment 130 in the elevated position, preventing the refuse compartment 130 from falling, even in the event of a hydraulic leak.

To reconfigure the refuse vehicle 100 from the maintenance configuration to the damping configuration, the maintenance prop 770 is removed. Hydraulic fluid is bled from the cap end volumes 720. By way of example, the maintenance pump 762 may have a drain functionality to permit the maintenance pump 762 to receive the hydraulic fluid. Once the refuse compartment 130 has been fully lowered, the maintenance pump 762 is disconnected from the fitting 730. The fitting 730 is then connected to the fitting 760, fluidly coupling the tank 752 to the node 732. The spring mounts 570 are reconnected (e.g., by reattaching the bolts 614). At this point, the refuse vehicle 100 is in the damping configuration of FIG. 28.

Referring to FIG. 28, in the damping configuration the cap end volumes 720 are coupled to the tank 752 through the check valves 740, the orifices 742, the fitting 730, and the fitting 760. In this configuration, the lift cylinders 582 permit upward and downward movement of the refuse compartment 130 relative to the chassis 20. When the refuse compartment 130 moves upward, the check valves 740 open to permit fluid to freely flow from the tank 752 to the cap end volumes 720. Accordingly, the refuse compartment 130 is permitted to rise freely with minimal or no damping forces provided by the body lift assembly 580.

When the refuse compartment 130 moves downward, the check valves 740 close, and fluid is forced from the cap end volumes 720 to the tank 752 through the orifices 742. The orifices 742 resist the flow therethrough, causing the body lift cylinders 582 to impart a dampening force. Accordingly, the body lift cylinders 582 resist downward movement of the refuse compartment 130 relative to the chassis 20. As such, the body lift cylinders 582 help to mitigate the stresses experienced by the refuse vehicle 100 when body slap occurs.

As utilized herein, the terms "approximately," "about," "substantially", and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the disclosure as recited in the appended claims.

It should be noted that the term "exemplary" and variations thereof, as used herein to describe various embodiments, are intended to indicate that such embodiments are possible examples, representations, or illustrations of possible embodiments (and such terms are not intended to connote that such embodiments are necessarily extraordinary or superlative examples).

The term "coupled" and variations thereof, as used herein, means the joining of two members directly or indirectly to one another. Such joining may be stationary (e.g., permanent or fixed) or moveable (e.g., removable or releasable). Such joining may be achieved with the two members coupled directly to each other, with the two members coupled to each other using a separate intervening member and any additional intermediate members coupled with one another, or with the two members coupled to each other using an intervening member that is integrally formed as a single unitary body with one of the two members. If "coupled" or variations thereof are modified by an additional term (e.g., directly coupled), the generic definition of "coupled" provided above is modified by the plain language meaning of the additional term (e.g., "directly coupled" means the joining of two members without any separate intervening member), resulting in a narrower definition than the generic definition of "coupled" provided above. Such coupling may be mechanical, electrical, or fluidic.

References herein to the positions of elements (e.g., "top," "bottom," "above," "below") are merely used to describe the orientation of various elements in the FIGURES. It should be noted that the orientation of various elements may differ according to other exemplary embodiments, and that such variations are intended to be encompassed by the present disclosure.

The hardware and data processing components used to implement the various processes, operations, illustrative logics, logical blocks, modules and circuits described in connection with the embodiments disclosed herein may be implemented or performed with a general purpose single- or multi-chip processor, a digital signal processor (DSP), an application specific integrated circuit (ASIC), a field programmable gate array (FPGA), or other programmable logic device, discrete gate or transistor logic, discrete hardware components, or any combination thereof designed to perform the functions described herein. A general purpose processor may be a microprocessor, or, any conventional processor, controller, microcontroller, or state machine. A processor also may be implemented as a combination of computing devices, such as a combination of a DSP and a microprocessor, a plurality of microprocessors, one or more microprocessors in conjunction with a DSP core, or any other such configuration. In some embodiments, particular processes and methods may be performed by circuitry that is specific to a given function. The memory (e.g., memory, memory unit, storage device) may include one or more devices (e.g., RAM, ROM, Flash memory, hard disk storage) for storing data and/or computer code for completing or facilitating the various processes, layers and modules described in the present disclosure. The memory may be or include volatile memory or non-volatile memory, and may include database components, object code components, script components, or any other type of information structure for supporting the various activities and information structures described in the present disclosure. According to an exemplary embodiment, the memory is communicably connected to the processor via a processing circuit and includes computer code for executing (e.g., by the processing circuit or the processor) the one or more processes described herein.

The present disclosure contemplates methods, systems and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions include, for example, instructions and data which cause a general purpose computer, special purpose computer, or special purpose processing machines to perform a certain function or group of functions.

Although the figures and description may illustrate a specific order of method steps, the order of such steps may differ from what is depicted and described, unless specified differently above. Also, two or more steps may be performed concurrently or with partial concurrence, unless specified differently above. Such variation may depend, for example, on the software and hardware systems chosen and on designer choice. All such variations are within the scope of the disclosure. Likewise, software implementations of the described methods could be accomplished with standard programming techniques with rule-based logic and other logic to accomplish the various connection steps, processing steps, comparison steps, and decision steps.

It is important to note that the construction and arrangement of the vehicle 10 and the systems and components thereof as shown in the various exemplary embodiments is illustrative only. Additionally, any element disclosed in one embodiment may be incorporated or utilized with any other embodiment disclosed herein. Although only one example of an element from one embodiment that can be incorporated or utilized in another embodiment has been described above, it should be appreciated that other elements of the various embodiments may be incorporated or utilized with any of the other embodiments disclosed herein.

What is claimed is:

1. A vehicle comprising:
a chassis including a pair of longitudinal frame rails;
a body;
a pivot mount pivotally coupling the body to the chassis such that the body is rotatable about an axis of rotation extending laterally;
a body lift cylinder coupled to the chassis and the body; and
a spring mount coupling the body to the chassis, the spring mount being positioned longitudinally forward of the axis of rotation, and the spring mount being configured to apply a biasing force to resist upward movement of the body relative to the chassis,
wherein the spring mount is positioned within 3 feet of a neutral twist axis of the chassis; and
wherein the body lift cylinder is pivotally coupled to the body such that the body lift cylinder is rotatable relative to the body about a lateral axis positioned forward of a front wall of the body.

2. The vehicle of claim 1, wherein the vehicle is a refuse vehicle including a lift assembly configured to lift a refuse container, and wherein the body includes:
a tailgate;
a hopper volume positioned to receive refuse from the refuse container when the refuse container is lifted by the lift assembly;
a storage volume extending between the hopper volume and the tailgate;
a packer configured to move the refuse from the hopper volume and the storage volume; and
a midpost positioned between the hopper volume and the storage volume,
wherein the spring mount is positioned forward of the midpost.

3. The vehicle of claim 1, wherein the body lift cylinder is configured to be fluidly coupled to a pump to receive a flow of hydraulic fluid, and wherein the body lift cylinder is configured to raise the body relative to the chassis in response to receiving the flow of hydraulic fluid.

4. The vehicle of claim 3, further comprising a reservoir and an orifice fluidly coupled to the body lift cylinder, wherein the orifice is configured to resist flow out of the body lift cylinder such that the body lift cylinder provides a damping force that resists movement of the body toward the chassis.

5. The vehicle of claim 4, further comprising a check valve configured to permit fluid to flow freely into the body lift cylinder when the body moves away from the chassis.

6. The vehicle of claim 1, wherein the spring mount is positioned within 1 foot of the neutral twist axis of the chassis.

7. The vehicle of claim 1, further comprising:
a first tractive element coupled to a front end portion of a first longitudinal frame rail of the pair of longitudinal frame rails;
a second tractive element coupled to a rear end portion of the first longitudinal frame rail;
a third tractive element coupled to a front end portion of a second longitudinal frame rail of the pair of longitudinal frame rails; and
a fourth tractive element coupled to a rear end portion of the second longitudinal frame rail,
wherein a longitudinal position of the neutral twist axis is determined by:

raising the first tractive element and the fourth tractive element relative to the second tractive element and the third tractive element;

measuring a vertical offset distance between the first longitudinal frame rail and the second longitudinal frame rail at one or more longitudinal positions along the chassis; and identifying a first longitudinal position of the one or more longitudinal positions at which the vertical offset distance is approximately zero as the longitudinal position of the neutral twist axis.

8. A refuse vehicle comprising:

a chassis including a pair of longitudinal frame rails;

a body including:

a refuse compartment defining a hopper volume and a storage volume;

a midpost positioned between the hopper volume and the storage volume; and a packer configured to move within the hopper volume and the storage volume;

a lift assembly configured to engage and lift a refuse container to transfer refuse from the refuse container into the hopper volume;

a pivot mount pivotally coupling the body to the chassis such that the body is rotatable about an axis of rotation extending laterally; and a spring mount coupling the body to the chassis and configured to apply a biasing force to resist upward movement of the body relative to the chassis, wherein the spring mount is positioned longitudinally forward of the axis of rotation and the midpost.

9. The refuse vehicle of claim 8, wherein the lift assembly is a side-loading lift assembly configured to engage the refuse container while the refuse container is laterally offset from the body, and wherein the lift assembly is positioned longitudinally forward of the spring mount.

10. The refuse vehicle of claim 8, wherein the body includes a front wall defining a front end of the hopper volume, and wherein the spring mount is positioned longitudinally rearward of the front wall.

11. The refuse vehicle of claim 8, further comprising a cylinder coupled to the body and to the chassis, wherein the cylinder is positioned longitudinally forward of the spring mount.

12. The refuse vehicle of claim 11, wherein the cylinder is configured to apply an upward force on the body to lift the body relative to the chassis.

13. The refuse vehicle of claim 11, wherein the cylinder is configured to apply a damping force that resists movement of the body relative to the chassis.

14. The refuse vehicle of claim 8, further comprising a cylinder coupled to the body and to the chassis, wherein the cylinder is positioned longitudinally forward of the spring mount;

wherein the lift assembly is a side-loading lift assembly configured to engage the refuse container while the refuse container is laterally offset from the body, and wherein the lift assembly is positioned longitudinally forward of the spring mount; and wherein the body includes a front wall defining a front end of the hopper volume, and wherein the spring mount is positioned longitudinally rearward of the front wall.

15. A refuse vehicle comprising:

a chassis including a pair of longitudinal frame rails;

a body including:

a refuse compartment defining a hopper volume and a storage volume;

a midpost positioned between the hopper volume and the storage volume; and a packer configured to move within the hopper volume and the storage volume;

a lift assembly configured to engage and lift a refuse container to transfer refuse from the refuse container into the hopper volume;

a pivot mount pivotally coupling the body to the chassis such that the body is rotatable about an axis of rotation extending laterally;

a cylinder coupled to the body and the chassis; and a spring mount coupling the body to the chassis and configured to apply a biasing force to resist upward movement of the body relative to the chassis, wherein the spring mount is positioned longitudinally forward of the axis of rotation and the midpost, wherein the spring mount is positioned longitudinally rearward of the lift assembly and the cylinder, and wherein the spring mount is positioned within 3 feet of a neutral twist axis of the chassis.

16. The refuse vehicle of claim 15, wherein the cylinder is configured to be fluidly coupled to a pump to receive a flow of hydraulic fluid through a check valve, and wherein the cylinder is configured to raise the body relative to the chassis in response to receiving the flow of hydraulic fluid.

17. The refuse vehicle of claim 16, further comprising a reservoir and an orifice fluidly coupled to the cylinder, wherein the orifice is configured to resist flow out of the cylinder such that the cylinder provides a damping force that resists movement of the body toward the chassis.

18. A refuse vehicle comprising:

a chassis including a pair of longitudinal frame rails;

a lift assembly configured to lift a refuse container;

a body including:

a tailgate;

a hopper volume positioned to receive refuse from the refuse container when the refuse container is lifted by the lift assembly;

a storage volume extending between the hopper volume and the tailgate;

a packer configured to move the refuse from the hopper volume and the storage volume; and a midpost positioned between the hopper volume and the storage volume;

a pivot mount pivotally coupling the body to the chassis such that the body is rotatable about an axis of rotation extending laterally; and a spring mount coupling the body to the chassis, the spring mount being positioned longitudinally forward of the axis of rotation and the midpost, and the spring mount being configured to apply a biasing force to resist upward movement of the body relative to the chassis, wherein the spring mount is positioned within 3 feet of a neutral twist axis of the chassis.

19. The refuse vehicle of claim 18, wherein the spring mount is positioned longitudinally between the midpost and the lift assembly.

20. A refuse vehicle, comprising:

a chassis including a pair of longitudinal frame rails;

a lift assembly configured to lift a refuse container;

a body including:

a tailgate;

a hopper volume positioned to receive refuse from the refuse container when the refuse container is lifted by the lift assembly;

a storage volume extending between the hopper volume and the tailgate;

a packer configured to move the refuse from the hopper volume and the storage volume; and a midpost positioned between the hopper volume and the storage volume;

a pivot mount pivotally coupling the body to the chassis such that the body is rotatable about an axis of rotation extending laterally;

a body lift cylinder coupled to the chassis and the body; and a spring mount coupling the body to the chassis, the spring mount being positioned longitudinally forward of the axis of rotation, and the spring mount being configured to apply a biasing force to resist upward movement of the body relative to the chassis, wherein the spring mount is positioned forward of the midpost within 3 feet of a neutral twist axis of the chassis.

* * * * *